United States Patent
Belleschi et al.

(10) Patent No.: US 12,382,503 B2
(45) Date of Patent: Aug. 5, 2025

(54) BALANCING RA RESOURCES BETWEEN 2-STEP RACH AND 4-STEP RACH

(71) Applicant: Telefonaktiebolaget LM Ericsson (publ), Stockholm (SE)

(72) Inventors: Marco Belleschi, Solna (SE); Luca Lunardi, Genoa (IT); Pablo Soldati, Solna (SE); Ali Parichehrehteroujeni, Linköping (SE); Johan Rune, Lidingö (SE); Angelo Centonza, Torrenueva Costa (ES); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 489 days.

(21) Appl. No.: 17/922,091

(22) PCT Filed: Apr. 29, 2021

(86) PCT No.: PCT/SE2021/050398
§ 371 (c)(1),
(2) Date: Oct. 28, 2022

(87) PCT Pub. No.: WO2021/221557
PCT Pub. Date: Nov. 4, 2021

(65) Prior Publication Data
US 2023/0171810 A1 Jun. 1, 2023

Related U.S. Application Data

(60) Provisional application No. 63/017,957, filed on Apr. 30, 2020.

(51) Int. Cl.
H04W 74/0833 (2024.01)

(52) U.S. Cl.
CPC ............... H04W 74/0833 (2013.01)

(58) Field of Classification Search
CPC ............... H04W 74/0833; H04L 12/28
(Continued)

(56) References Cited

U.S. PATENT DOCUMENTS

2019/0159269 A1 5/2019 Novlan et al.
2023/0354425 A1* 11/2023 Jeon ............... H04L 5/0048

OTHER PUBLICATIONS

Author Unknown, "Technical Specification Group Services and System Aspects; 3GPP System Architecture Evolution (SAE); Security architecture (Release 16)," Technical Specification 33.401, Version 16.2.0, Mar. 2020, 3GPP Organizational Partners, 167 pages.

(Continued)

*Primary Examiner* — Dang T Ton
(74) *Attorney, Agent, or Firm* — Withrow & Terranova, PLLC

(57) ABSTRACT

Systems and methods related to balancing random access resources between 2-step Random Access Channel (RACH) and 4-step RACH. In one embodiment, a method performed by a first network node comprises obtaining information related to 2-step RACH and/or 4-step RACH, for cell(s) and/or beam(s) controlled by the first network node. The method further comprises determining, based on the obtained information, first assistance information for 2-step and/or 4-step RACH configuration, for the cell(s) and/or the beam(s) controlled by the first network node. The method further comprises transmitting, to a second network node, second assistance information for the 2-step and/or 4-step RACH configuration, for the cell(s) and/or the beam(s) controlled by the first network node. The second assistance information comprises the first assistance information or information that indicates one or more parts of the first assistance information.

17 Claims, 9 Drawing Sheets

(58) Field of Classification Search
USPC .......................................... 370/329.401, 403
See application file for complete search history.

(56) References Cited

OTHER PUBLICATIONS

Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.9.0, Mar. 2020, 3GPP Organizational Partners, 964 pages.

Author Unknown, "Technical Specification Group Radio Access Network; NR; Medium Access Control (MAC) protocol specification (Release 15)," Technical Specification 38.321, Version 15.8.0, Dec. 2019, 3GPP Organizational Partners, 78 pages.

Author Unknown, "Technical Specification Group Radio Access Network; NR; Radio Resource Control (RRC) protocol specification (Release 15)," Technical Specification 38.331, Version 15.9.0, Mar. 2020, 3GPP Organizational Partners, 536 pages.

Author Unknown, "Technical Specification Group Radio Access Network; NG-RAN; Architecture description (Release 15)," Technical Specification 38.401, Version 15.5.0, Mar. 2019, 3GPP Organizational Partners, 39 pages.

Author Unknown, "Technical Specification Group Radio Access Network; NG-RAN; Xn application protocol (XnAP) (Release 15)," Technical Specification 38.423, Version 15.7.0, Mar. 2020, 3GPP Organizational Partners, 317 pages.

OPPO, "R2-1912086: Remaining stage-2 open issues for 2-step RACH," 3GPP TSG-RAN WG2 Meeting #107bis, Oct. 14-18, 2019, Chongqing, China, 4 pages.

International Search Report and Written Opinion for International Patent Application No. PCT/SE2021/050398, mailed Aug. 12, 2021, 12 pages.

* cited by examiner

BALANCING RA RESOURCES BETWEEN 2-STEP RACH AND 4-STEP RACH

RELATED APPLICATIONS

This application is a 35 U.S.C. § 371 national phase filing of International Application No. PCT/SE2021/050398, filed Apr. 29, 2021, which claims the benefit of provisional patent application Ser. No. 63/017,957, filed Apr. 30, 2020, the disclosures of which are hereby incorporated herein by reference in their entireties.

TECHNICAL FIELD

The present disclosure relates to Random Access Channel (RACH) configuration in a cellular communications system.

BACKGROUND

Random Access in New Radio (NR)

In NR, besides the classical 4-step random access procedure (which is present also in Long Term Evolution (LTE)), a new 2-step random access procedure has been specified as part of the Third Generation Partnership Project (3GPP) Release 16 standard. From FIG. 1, it is possible to compare the 4-step Random Access Channel (RACH) procedure and the 2-step RACH procedure. A clear advantage of the 2-step RACH procedure over the 4-step RACH is that the 2-step RACH is much faster. In particular, it is possible to show that the minimum latency that can be achieved between the Physical Random Access Channel (PRACH) transmission until msg4 reception, i.e. contention resolution, with the 4-step RACH is 13 subframes. As comparison, for 2-step RACH, the minimum achievable latency is 4 subframes. This makes 2-step RACH around 3 times faster than 4-step RACH. On the other hand, in 2-step RACH, the User Equipment (UE) may transmit data, i.e., the payload, as part of msgA, i.e., before getting a proper uplink timing alignment from the network. Additionally, data transmitted in msgA has not yet been link adapted by the network. This means that the probability of properly decoding the payload at network side very much depends on how good the uplink synchronization already is at the time of sending msgA, e.g., it may depend on the cell size, and also on how good the link quality is at the time of sending msgA. Given the above, assuming that the bandwidth part (BWP) selected for random access procedure has both 4-step and 2-step RACH resources configured, the UE selects the 2-step RACH resources only if the estimated downlink Reference Signal Received Power (RSRP) is above a certain configurable threshold, which is defined in the Medium Access Control (MAC) specification as msgA-RSRP-Threshold.

Given the above discussion, the 2-step RACH technique may be particularly appealing for use cases requiring quick channel access, such as industrial use cases, or for example in the case of transmissions in unlicensed spectrum (e.g. NR in Unlicensed spectrum (NR-U), License Assisted Access (LAA)) where the UE/NR base station (gNB) may need to postpone the transmission of random access messages several times due to Listen Before Talk (LBT) failures, i.e. channel detected as occupied by other concurrent transmissions. Since in 2-step RACH only msgA and msgB need to be exchanged, the probability of LBT failures during the random access is obviously less than in the case of 4-step RACH. The 2-step approach may also be appealing in case the network deployment is such that the network coverage is good enough to ensure good 2-step RACH performances.

Taking a closer look at 2-step random access procedures, it is important to note that, like in the 4-step RACH procedure, the UE can select the RACH preamble from two groups of 2-step RACH preambles, depending on the size of the payload to be included in msgA. At transmission of 2-step RACH, the UE starts the msgB-ResponseWindow timer and starts monitoring Physical Downlink Control Channel (PDCCH) with the msgB Radio Network Temporary Identifier (msgB-RNTI). In case no msgB is received within msgB-ResponseWindow, or in case the gNB sends a backoff indicator in msgB, the UE reattempts msgA transmission and applies power ramping. Otherwise, the network may include a successRAR flag in the msgB to indicate that msgA (preamble+payload) decoding was successful. In this case, if the UE contention resolution identity included in msgB matches the one included by the UE in msgA, the random access procedure is considered successful, and the UE will use the Cell Radio Network Temporary Identifier (C-RNTI) included in the msgB for successive communications with the network.

The network may also include a fallback indicator in the msgB to indicate to the UE to fallback to 4-step. The fallback procedure may be used, for example, in case the network successfully decodes the preamble, but it is not able to decode the payload in msgA. Therefore, in case the msgB MAC Protocol Data Unit (PDU) with fallbackRAR includes a Random Access Preamble Identifier (RAPID) which matches the preamble index used by the UE in msgA, the UE continues with msg3 transmission using the uplink grant and the Temporary C-RNTI included in msgB. Hence, the UE moves the payload intended to be transmitted in msgA to the msg3 buffer, and it waits for msg4 to resolve the contention.

Finally, a switch procedure is also considered in the 3GPP specifications. The UE switches from 2-step RACH to 4-step RACH after attempting the 2-step RACH transmission a certain amount of time with no success. Unlike the fallback procedure, the switch procedure implies that the UE drops the 2-step RACH resources and restarts random access starting from the 4-step RACH msg1 by selecting a new 4-step RACH resource.

NR Architecture

The current Fifth Generation (5G) Radio Access Network (RAN) (NG-RAN) architecture is depicted in FIG. 2 and described in 3GPP Technical Specification (TS) 38.401 v15.5.0 as follows:

\*\*\*\*\*\*\*\*\*\*START EXCERPT FROM 3GPP TS 38.401\*\*\*\*\*\*\*\*\*\*

The NG architecture can be further described as follows:
 The NG-RAN consists of a set of gNBs connected to the 5GC through the NG.
 An gNB can support FDD mode, TDD mode or dual mode operation.
 gNBs can be interconnected through the Xn.
 A gNB may consist of a gNB-CU and gNB-DUs. A gNB-CU and a gNB-DU is connected via F1 logical interface.
 One gNB-DU is connected to only one gNB-CU.
  NOTE: For resiliency, a gNB-DU may be connected to multiple gNB-CU by appropriate implementation.

\*\*\*\*\*\*\*\*\*\*END EXCERPT FROM 3GPP TS 38.401\*\*\*\*\*\*\*\*\*\*

NG, Xn and F1 are logical interfaces. The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface (NG, Xn, F1), the related TNL protocol and the functionality are specified. The TNL provides services for user plane transport, signaling transport. If security protection for control plane and user plane data on TNL of NG-RAN interfaces has to be supported, NDS/IP (3GPP TS 33.401 shall be applied).

A gNB may also be connected to an LTE eNB via the X2 interface. Another architectural option is that where an LTE eNB connected to the Evolved Packet Core network is connected over the X2 interface with a so called en-gNB. The latter is a gNB not connected directly to a CN and connected via X2 to an eNB for the sole purpose of performing dual connectivity.

The architecture in FIG. 2 can be expanded by spitting the gNB-CU into two entities, namely, a Control Plane (CP) entity (gNB-CU-CP or simply CU-CP) and a User Plane (UP) entity (gNB-CU-UP or simply CU-UP), as illustrated in FIG. 3. So, in the split architecture option, the RAN protocol stack functionality is separated in different parts. The CU-CP is expected to handle the Radio Resource Control (RRC) layer, the CU-UP will handle the Packet Data Convergence Protocol (PDCP) layer, and the DU will handle the Radio Link Control (RLC) layer, the MAC layer, and the physical (PHY) layer of the protocol stack. In some further split the DU can have a separate unit that handles the PHY parts separately compared to RLC and MAC layers that are handled in a DU.

As different units handle different protocol stack functionalities, there will be a need for inter-node communication between the DU, the CU-UP, and the CU-CP. This is achieved via F1-C interface related to control plane signaling, via F1-U interface related to user plane signaling for communication between CU and DU, and via E1 for communication between CU-UP and CU-CP.

The E1 interface is a logical interface. It supports the exchange of signaling information between the endpoints. From a logical standpoint, the E1 is a point-to-point interface between a gNB-CU-CP and a gNB-CU-UP. The E1 interface enables exchange of UE associated information and non-UE associated information. The E1 interface is a control interface and is not used for user data forwarding.

SUMMARY

Systems and methods related to balancing random access resources between 2-step Random Access Channel (RACH) and 4-step RACH. In one embodiment, a method performed by a first network node for RACH configuration comprises obtaining information related to 2-step RACH, 4-step RACH, or both 2-step RACH and 4-step RACH, for one or more cells controlled by the first network node, one or more beams controlled by the first network node, or both one or more cells and one or more beams controlled by the first network node. The method further comprises determining, based on the obtained information, first assistance information for 2-step RACH configuration, 4-step RACH configuration, or both the 2-step RACH configuration and the 4-step RACH configuration, for the one or more cells controlled by the first network node, the one or more beams controlled by the first network node, or both the one or more cells and the one or more beams controlled by the first network node. The method further comprises transmitting, to a second network node, second assistance information for the 2-step RACH configuration, the 4-step RACH configuration, or both the 2-step RACH configuration and the 4-step RACH configuration, for the one or more cells controlled by the first network node, the one or more beams controlled by the first network node, or both the one or more cells and the one or more beams controlled by the first network node. The second assistance information comprises the first assistance information or information that indicates one or more parts of the first assistance information. In this manner, the network is enabled to determine the most appropriate random access scheme to use and provide the appropriate random RACH configurations.

In one embodiment, the first network node is a Central Unit (CU) of a base station having a split CU/Distributed Unit (DU) architecture, and the second network node is a DU of the base station.

In one embodiment, the first assistance information comprises: (a) information that indicates whether 2-step RACH may be configured for the one or more cells controlled by the first network node, the one or more beams controlled by the first network node, or both the one or more cells and the one or more beams controlled by the first network node, (b) information that indicates whether 4-step RACH may be configured for the one or more cells controlled by the first network node, the one or more beams controlled by the first network node, or both the one or more cells and the one or more beams controlled by the first network node, (c) information that indicates whether 2-step RACH may be configured for one or more downlink reference signal beams transmitted on the one or more cells controlled by the first network node, the one or more beams controlled by the first network node, or both the one or more cells and the one or more beams controlled by the first network node, (d) information that indicates whether 4-step RACH may be configured for one or more downlink reference signal beams transmitted on the one or more cells controlled by the first network node, the one or more beams controlled by the first network node, or both the one or more cells and the one or more beams controlled by the first network node, (e) information that indicates one or more downlink reference signal beams that may benefit from 2-step RACH, (f) information that indicates one or more downlink reference signal beams that may benefit from 4-step RACH, (g) a measurement value threshold that may be adopted by a User Equipment (UE) to determine whether to select the 2-step RACH or the 4-step RACH, or (h) a combination of any two or more of (a)-(g).

In one embodiment, the second assistance information comprises: (i) an indication of a preference on whether to configure 2-step RACH resources for the one or more cells controlled by the first network node, the one or more beams controlled by the first network node, or both the one or more cells and the one or more beams controlled by the first network node, (ii) an indication of a preference on whether to configure 4-step RACH resources for the one or more cells controlled by the first network node, the one or more beams controlled by the first network node, or both the one or more cells and the one or more beams controlled by the first network node, (iii) an indication of a suggested ratio between 2-step RACH resources and 4-step RACH resources for the one or more cells controlled by the first network node, the one or more beams controlled by the first network node, or both the one or more cells and the one or more beams controlled by the first network node, (iv) an indication of whether shared or separate 2-step RACH and 4-step RACH occasions are recommended or required, (v) a measurement value threshold for the one or more cells controlled by the first network node, the one or more beams controlled by the first network node, or both the one or more cells and the one or more beams controlled by the first network node, to be adopted by a UE to determine whether to select the 2-step RACH or the 4-step RACH, (vi) statistical information about measurements reported to the first network node, (vii) statistical information about 2-step RACH or 4-step RACH procedure performance at one or more neighboring cells and/or one or more neighboring beams, (viii) statistical information about measurements reported to the first network node associated to a coverage area of downlink reference signal beams for the one or more cells controlled by the first network node, the one or more beams controlled by the first network node, or both the one or more cells and the one or more beams controlled by the first network node, (ix) for some or all cells served by the second network node, information that indicates levels of interference experienced by neighboring cells for msg1 and/or msgA, or (x) a combination of any two or more of (i)-(ix).

In one embodiment, the first network node is a CU of a base station, and obtaining the information comprises receiving one or more CU-to-CU messages from one or more other CUs of one or more other base stations that control one or more neighboring cells and/or one or more neighboring beams, the one or more CU-to-CU messages comprising at least some of the information. In one embodiment, each CU-to-CU message comprises: (A) information that indicates a load or interference perceived on an uplink on RACH resources comprised in the 2-step RACH configuration for the one or more cells controlled by the first network node, the one or more beams controlled by the first network node, or both the one or more cells and the one or more beams controlled by the first network node, (B) information that indicates a load or interference perceived on an uplink on RACH resources comprised in the 4-step RACH configuration for the one or more cells controlled by the first network node, the one or more beams controlled by the first network node, or both the one or more cells and the one or more beams controlled by the first network node, (C) information that indicates interference as perceived on an uplink on an entire carrier frequency range, (D) information that indicates a RACH resource allocation associated to downlink reference signal beams in one or more respective neighboring cells, (E) information that indicates a RACH performance associated to the one or more respective neighboring cells or to a coverage area of downlink reference signal beams transmitted in the one or more respective neighboring cells, (F) one or more measurements reported by one or more UEs on one or more respective cells, or (G) a combination of any two or more of (A)-(F).

In one embodiment, the first network node is a CU of a base station, and obtaining the information comprises receiving one or more UE-to-CU messages from one or more UEs, the one or more UE-to-CU messages comprising at least some of the information. In one embodiment, the one or more UE-to-CU messages comprise one or more RACH reports, one or more cell-based measurement reports, one or more beam-based measurement reports, or a combination thereof.

In one embodiment, obtaining the information comprises collecting statistical information about measurements reported to the first network node.

In one embodiment, the method further comprises transmitting a message to a User Equipment, UE, that reflects information associated to a RACH resource adjustment for 2-step RACH, a RACH resource adjustment for 4-step RACH, or a RACH resource adjust for both 2-step RACH and 4-step RACH, in the one or more cells controlled by the first network node, the one or more beams controlled by the first network node, or both the one or more cells and the one or more beams controlled by the first network node.

In one embodiment, the second assistance information comprises information that indicates a requirement or recommendation to only configure 2-step RACH or to only configure 4-step RACH.

In one embodiment, the second assistance information comprises information that indicates a required or recommended relation between an amount of resources allocated to 2-step RACH as compared to an amount of resources allocated to 4-step RACH.

In one embodiment, the second assistance information comprises information that indicates a requirement or recommendation to only configure 2-step RACH, or to only configure 4-step RACH, or to configure both 2-step RACH and 4-step RACH.

In one embodiment, the second assistance information comprises information that indicates a requirement or recommendation to only configure 4-step RACH if an average Reference Signal Received Power, RSRP, is below a msgA-RSRP-Threshold that the second network node intends to use for 2-step RACH.

In one embodiment, the second assistance information comprises information that indicates a requirement or recommendation to increase or decrease an amount of resources allocated to 2-step RACH, information that indicates a requirement or recommendation to increase or decrease an amount of resources allocated to 4-step RACH, or both.

In one embodiment, the second assistance information comprises information that indicates a requirement or recommendation to adopt 2-step RACH on one or more particular beams.

In one embodiment, the second assistance information comprises information that indicates a requirement or recommendation to not adopt 2-step RACH on one or more particular beams.

In one embodiment, the second assistance information comprises information that indicates a requirement or recommendation to adopt a new measurement threshold for a User Equipment, UE, to select either the 2-step RACH or the 4-step RACH.

In one embodiment, the second assistance information comprises information that indicates a requirement or recommendation to increase a measurement threshold for a UE to select either the 2-step RACH or the 4-step RACH.

In one embodiment, determining the first assistance information comprises determining the first assistance information taking into account a Radio Resource Control (RRC) state of one or more UEs.

In one embodiment, determining the first assistance information comprises determining the first assistance information taking into account one or more services that one or more UEs intend to use on the one or more cells controlled by the first network node, the one or more beams controlled by the first network node, or both the one or more cells and the one or more beams controlled by the first network node.

In one embodiment, determining the first assistance information comprises determining the first assistance information taking into account one or more network slices that are supported by one or more cells of the second network node.

Corresponding embodiments of a first network node for RACH configuration are also disclosed. In one embodiment, a first network node for RACH configuration is adapted to obtain information related to 2-step RACH, 4-step RACH, or both 2-step RACH and 4-step RACH, for one or more cells controlled by the first network node, one or more beams controlled by the first network node, or both one or more cells and one or more beams controlled by the first network node. The first network node is further adapted to determine, based on the obtained information, first assistance information for 2-step RACH configuration, 4-step RACH configuration, or both the 2-step RACH configuration and the 4-step RACH configuration, for the one or more cells controlled by the first network node, the one or more beams controlled by the first network node, or both the one or more cells and the one or more beams controlled by the first network node. The first network node is further adapted to transmit, to a second network node, second assistance information for the 2-step RACH configuration, the 4-step RACH configuration, or both the 2-step RACH configuration and the 4-step RACH configuration, for the one or more cells controlled by the first network node, the one or more beams controlled by the first network node, or both the one or more cells and the one or more beams controlled by the first network node. The second assistance information comprises the first assistance information or information that indicates one or more parts of the first assistance information.

In one embodiment, a first network node for RACH configuration comprises processing circuitry configured to cause the first network node to obtain information related to 2-step RACH, 4-step RACH, or both 2-step RACH and 4-step RACH, for one or more cells controlled by the first network node, one or more beams controlled by the first network node, or both one or more cells and one or more beams controlled by the first network node. The processing circuitry is further configured to cause the first network node to determine, based on the obtained information, first assistance information for 2-step RACH configuration, 4-step RACH configuration, or both the 2-step RACH configuration and the 4-step RACH configuration, for the one or more cells controlled by the first network node, the one or more beams controlled by the first network node, or both the one or more cells and the one or more beams controlled by the first network node. The processing circuitry is further configured to cause the first network node to transmit, to a second network node, second assistance information for the 2-step RACH configuration, the 4-step RACH configuration, or both the 2-step RACH configuration and the 4-step RACH configuration, for the one or more cells controlled by the first network node, the one or more beams controlled by the first network node, or both the one or more cells and the one or more beams controlled by the first network node. The second assistance information comprises the first assistance information or information that indicates one or more parts of the first assistance information.

Embodiments of a method performed by a second network node for RACH configuration are also disclosed. In one embodiment, a method performed by a second network node for RACH configuration comprises obtaining information related to 2-step RACH, 4-step RACH, or both 2-step RACH and 4-step RACH, for one or more cells controlled by the first network node, one or more beams controlled by the first network node, or both one or more cells and one or more beams controlled by the first network node. The method further comprises determining, based on the obtained information, an adjustment to RACH resources used for the 2-step RACH, RACH resource used for the 4-step RACH, or both resources used for the 2-step RACH and resources used for the 4-step RACH, in the one or more cells controlled by the first network node, the one or more beams controlled by the first network node, or both the one or more cells and the one or more beams controlled by the first network node. The method further comprises transmitting, to the first network node, information that is indicative of the adjustment to the RACH resources used for the 2-step RACH, the RACH resources used for the 4-step RACH, or both the resources used for the 2-step RACH and the resources used for the 4-step RACH.

In one embodiment, the obtained information comprises statistical information about performed 2-step RACH and 4-step RACH in the one or more cells controlled by the first network node, the one or more beams controlled by the first network node, or both the one or more cells and the one or more beams controlled by the first network node.

In one embodiment, the adjustment to the RACH resources used for the 2-step RACH, the RACH resources used for the 4-step RACH, or both the resources used for the 2-step RACH and the resources used for the 4-step RACH comprises: (a) a configuration of a 2-step RACH or 4-step RACH resource, (b) a de-configuration of a 2-step RACH or 4-step RACH resource, (c) an adjustment of an amount of time/frequency resources that are configured for 2-step RACH, (d) an adjustment of an amount of time/frequency resources that are configured to 4-step RACH, (e) a reconfiguration of 2-step RACH resources providing a different time/frequency resource allocation, (f) a reconfiguration of 4-step RACH resources providing a different time/frequency resource allocation, (g) a change in a measurement value threshold to be adopted by a UE to determine whether to select 2-step RACH or 4-step RACH, (h) a combination of any two or more of (a)-(g).

Corresponding embodiments of a second network node for RACH configuration are also disclosed. In one embodiment, a second network node for RACH configuration is adapted to obtain information related to 2-step RACH, 4-step RACH, or both 2-step RACH and 4-step RACH, for one or more cells controlled by the first network node, one or more beams controlled by the first network node, or both one or more cells and one or more beams controlled by the first network node. The second network node is further adapted to determine, based on the obtained information, an adjustment to RACH resources used for the 2-step RACH, RACH resource used for the 4-step RACH, or both resources used for the 2-step RACH and resources used for the 4-step RACH, in the one or more cells controlled by the first network node, the one or more beams controlled by the first network node, or both the one or more cells and the one or more beams controlled by the first network node. The second network node is further adapted to transmit, to the first network node, information that is indicative of the adjustment to the RACH resources used for the 2-step RACH, the RACH resources used for the 4-step RACH, or both the resources used for the 2-step RACH and the resources used for the 4-step RACH.

In one embodiment, a second network node for RACH configuration comprises processing circuitry configured to cause the second network node to obtain information related to 2-step RACH, 4-step RACH, or both 2-step RACH and 4-step RACH, for one or more cells controlled by the first network node, one or more beams controlled by the first network node, or both one or more cells and one or more beams controlled by the first network node. The processing circuitry is further configured to cause the second network node to determine, based on the obtained information, an adjustment to RACH resources used for the 2-step RACH, RACH resource used for the 4-step RACH, or both resources used for the 2-step RACH and resources used for the 4-step RACH, in the one or more cells controlled by the first network node, the one or more beams controlled by the first network node, or both the one or more cells and the one or more beams controlled by the first network node. The processing circuitry is further configured to cause the second network node to transmit, to the first network node, information that is indicative of the adjustment to the RACH resources used for the 2-step RACH, the RACH resources used for the 4-step RACH, or both the resources used for the 2-step RACH and the resources used for the 4-step RACH.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
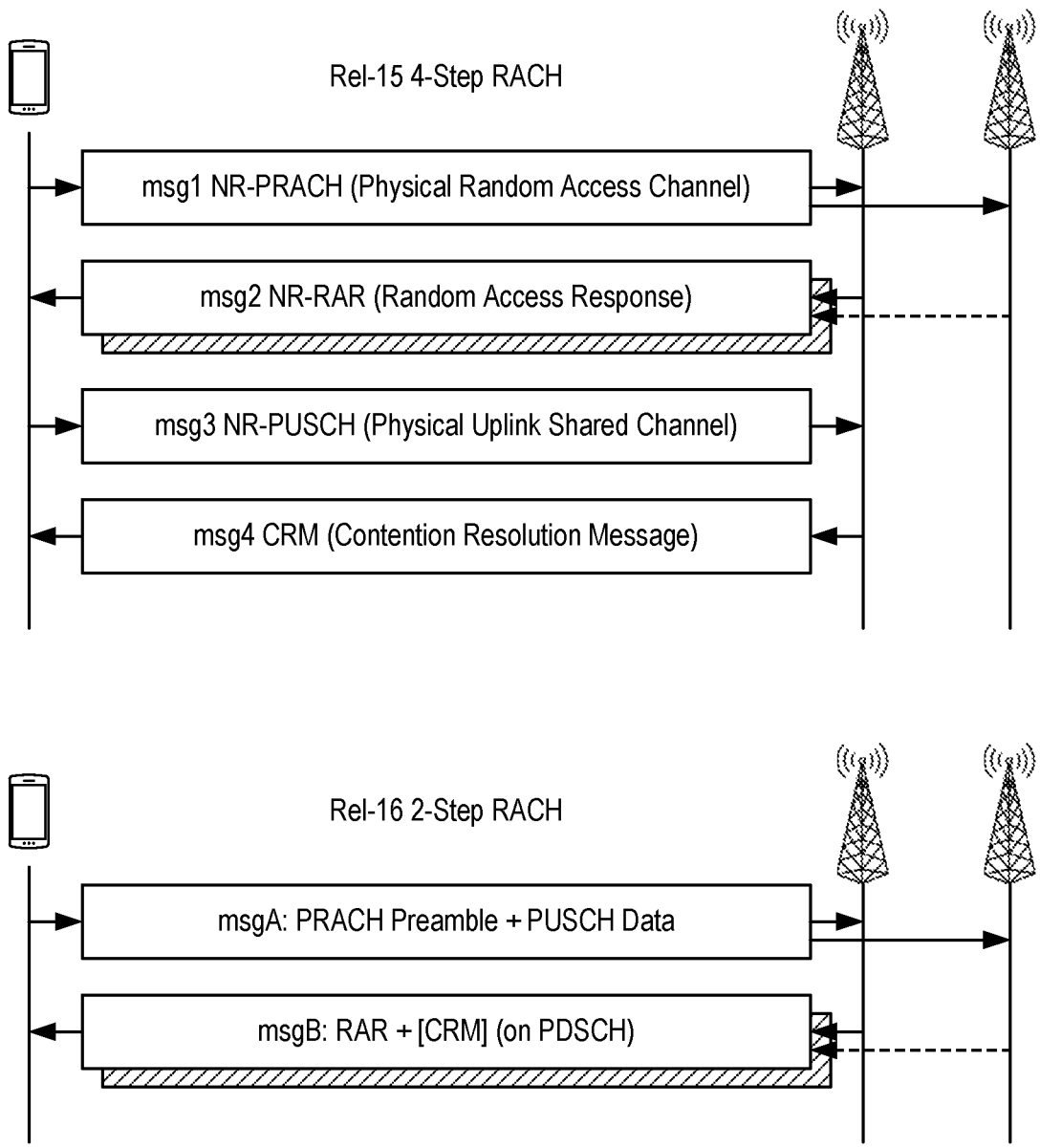
FIG. 1 illustrates a 4-step random access procedure and a 2-step random access procedure specified as part of the Third Generation Partnership Project (3GPP) Release 16 specifications.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network).

Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). Given the introduction of the new 2-step Random Access Channel (RACH) technique in 3GPP NR, the network may need to decide whether to use the 2-step RACH procedure and/or the 4-step RACH procedure and also decide how to properly balance the overall RACH resources between the 2-step and the 4 step RACH procedures. Therefore, the objective of a gNB should be to minimize RACH resource wastage and, at the same time, ensure good random access performance for the UEs.

In order to achieve such a result, the gNB may need to collect different sets of information, some of which are typically available at the Control Plane (CP) part of the Central Unit (CU) (CU-CP), and others which are typically available at the Distributed Unit (DU). Note that "CU-CP" in case "CU" is used to indicate signaling between RAN nodes (i.e., CU-CP to CU-CP signaling). Which information is needed for this purpose and which information needs to be exchanged between DU and CU-CP for optimizing the allocation of resources between 2-step and 4-step RACH procedures and possibly between CU-CPs of different gNBs is currently not addressed by 3GPP specifications.

Certain aspects of the present disclosure and their embodiments may provide solutions to the aforementioned or other challenges. Embodiments of methods for the gNB to determine whether to configure UEs in a cell(s) controlled by the gNB with 2-step RACH resources and/or 4-step RACH resources and how to partition RACH resources between 4-step RACH and 2-step RACH are disclosed. The methods take as an input one or multiple parameters, some of which are available at the DU, some others at the CU-CPs. To achieve this, signaling exchange between CU-CP and DU is disclosed for this purpose.

Certain embodiments may provide one or more of the following technical advantage(s). Embodiments disclosed herein give the means for the network to determine the most appropriate random access scheme to use on the basis of information which can be available at the DU or at the CU-CP.

Figure 4:
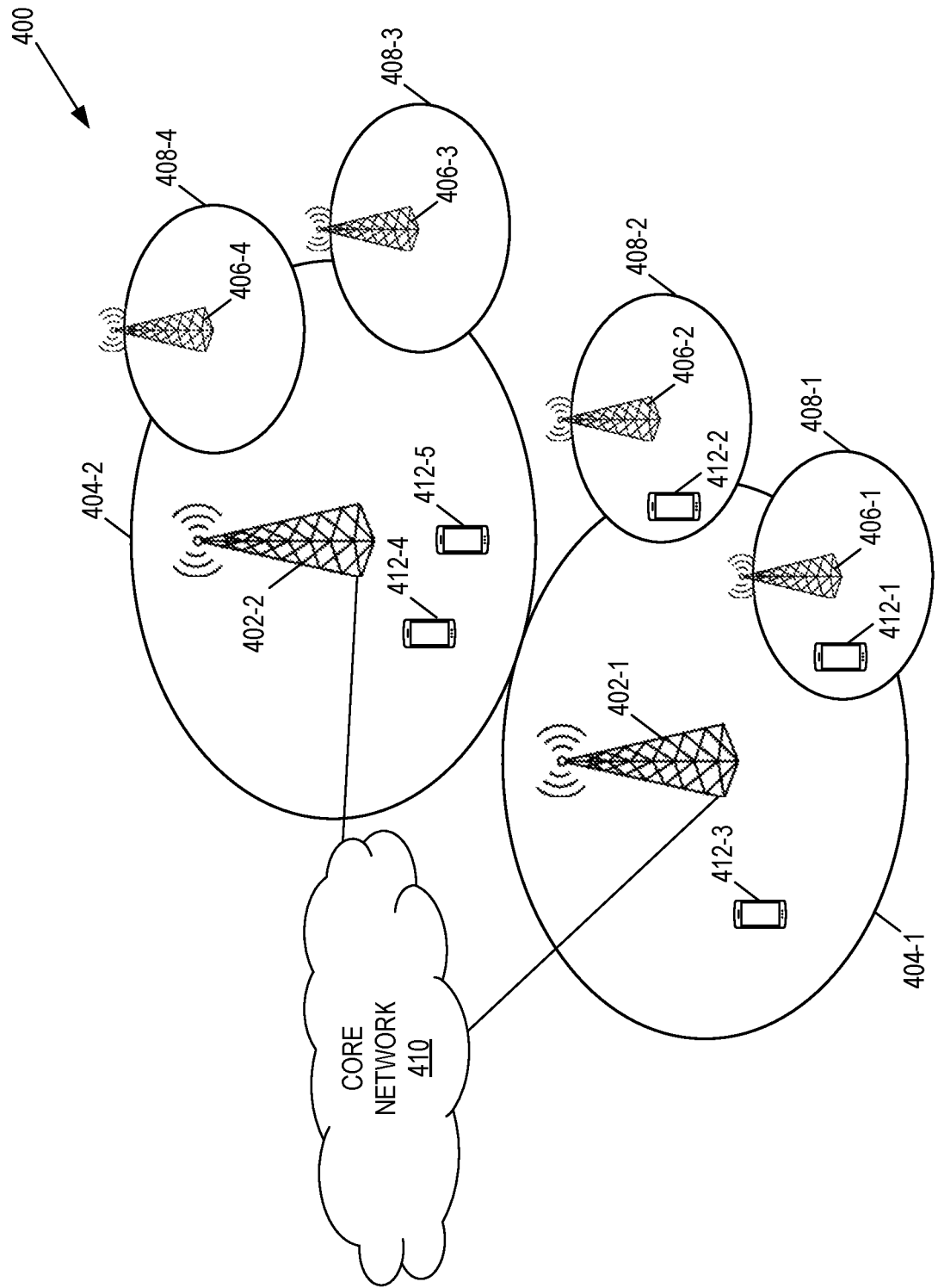
FIG. 4 illustrates one example of a cellular communications system in which embodiments of the present disclosure may be implemented.

FIG. 4 illustrates one example of a cellular communications system 400 in which embodiments of the present disclosure may be implemented. In the embodiments described herein, the cellular communications system 400 is a 5G System (5GS) including a NG-RAN or an Evolved Packet System (EPS) including an Evolved Universal Terrestrial Radio Access Network (E-UTRAN). In this example, the RAN includes base stations 402-1 and 402-2, which in the NG-RAN include gNBs and, optionally, ng-eNBs (i.e., LTE RAN nodes connected to the 5GC) and in the LTE RAN (i.e., E-UTRAN) are referred to as eNBs, controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5GS is referred to as the 5G Core (5GC). The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

Figure 2:
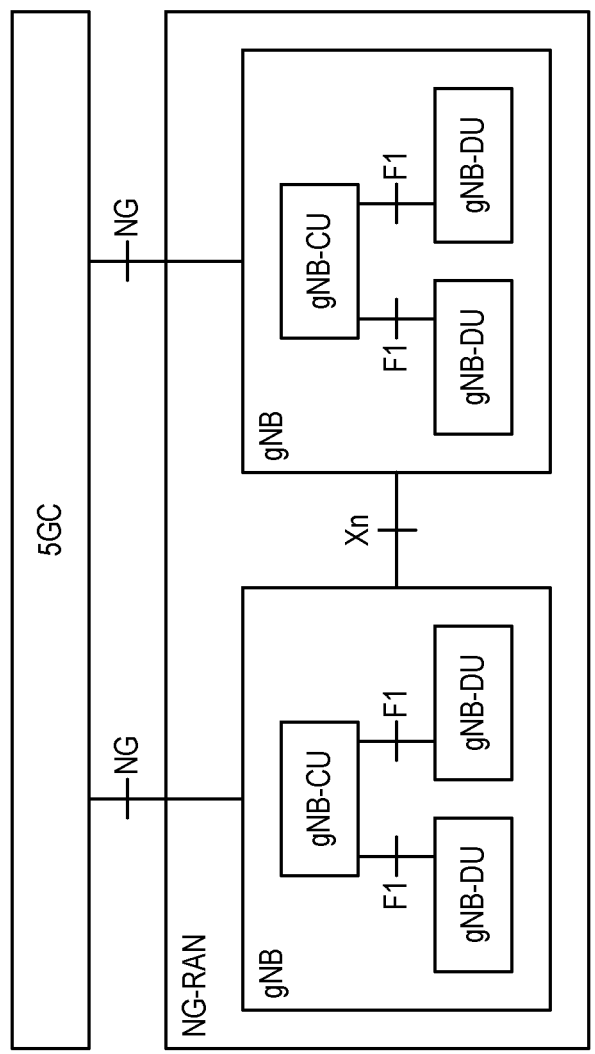
FIG. 2 illustrates the current Next Generation Radio Access Network (NG-RAN) architecture described in the 3GPP specifications.
Figure 3:
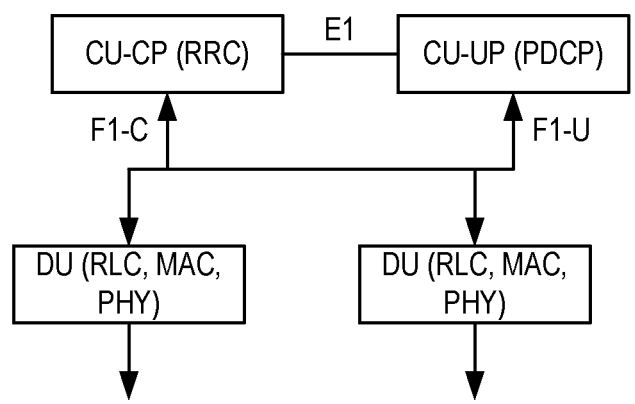
FIG. 3 illustrates an expansion of the New Radio (NR) base station (gNB) of FIG. 2 in which the gNB has a split architecture.
Figure 5:
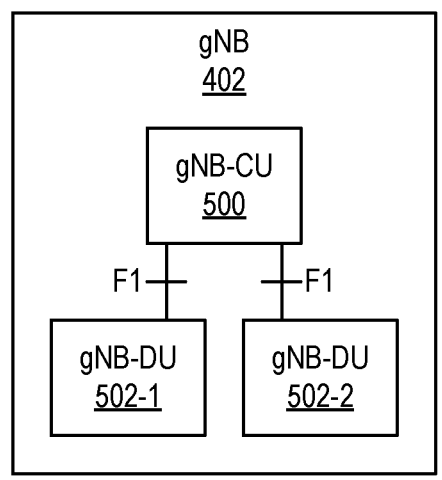
FIG. 5 illustrates an example in which the base station of FIG. 4 is a gNB having a split architecture.

In the embodiments described herein, the base stations 402 have a split architecture where each base station 402 includes a CU (which may further be split into a CU-CP and a CU-UP) and one or more DUs. As an example, see the split architecture of the gNB illustrated in FIGS. 1 and 2. In the embodiments described below, the base station 402 is a gNB having a split architecture as illustrated in FIG. 5. Thus, the base station 402 is also referred to herein as a gNB 402. In particular, the gNB 402 includes a gNB-CU 500 and one or more gNB-DUs 502. In the example of FIG. 5, the gNB 402 has two gNB-DUs 502, which are denoted as gNB-DUs 502-1 and 502-2.

Now, details of embodiments of the present disclosure will be described. Note that the embodiments of the solution(s) disclosed in the following are applicable to both CBRA and CFRA.

Figure 6:
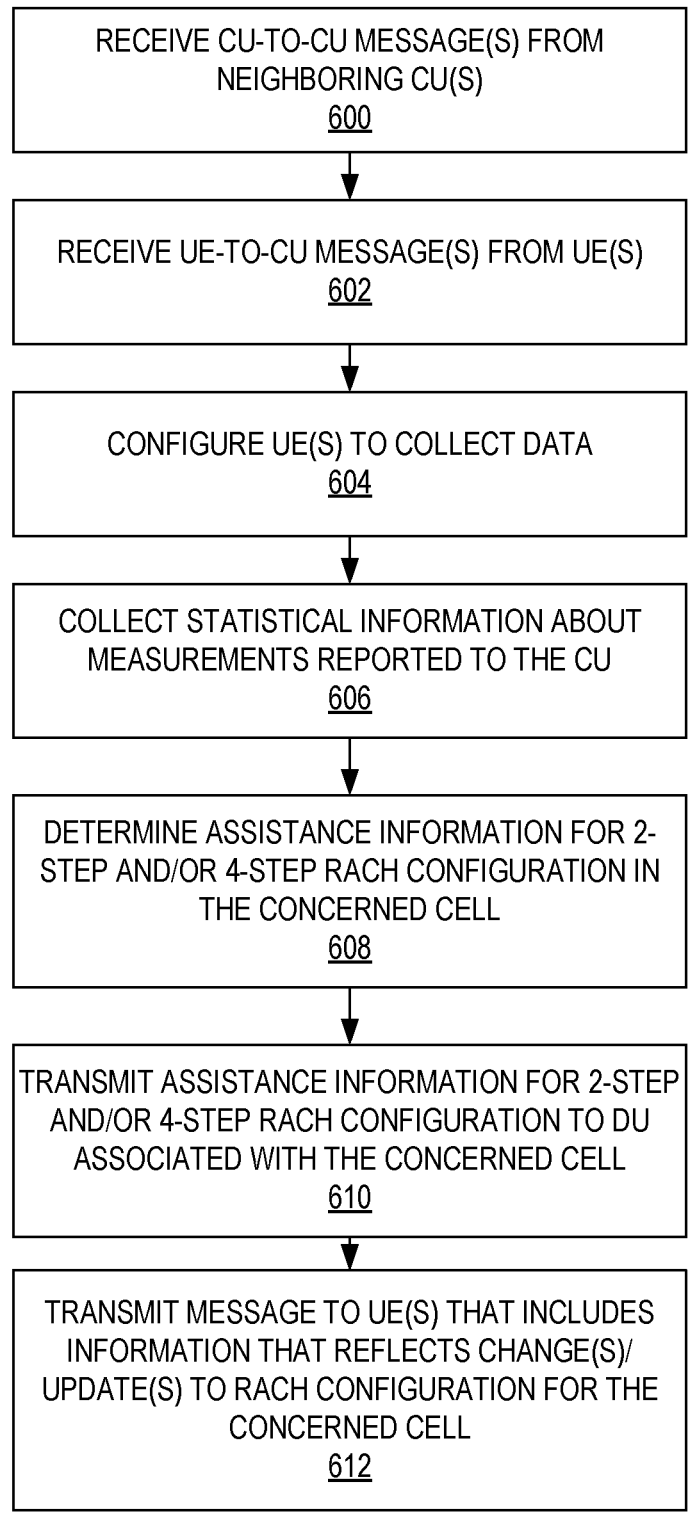
FIG. 6 is a flow chart that illustrates a process performed by the gNB Central Unit (CU) (gNB-CU) in accordance with some embodiments of the present disclosure.

Embodiments of a method performed by a gNB-CU 500 are disclosed herein. In this regard, FIG. 6 is a flow chart that illustrates a process performed by the gNB-CU 500 in accordance with some embodiments of the present disclosure. Note that not all of the illustrated steps are required. The process may include any one of the illustrated steps or any combination of two or more of the illustrated steps. As illustrated in FIG. 6, the process performed by the gNB-CU 500 includes:

Step 600: The gNB-CU 500 receives a CU-to-CU message from one or more neighboring gNB-CUs (i.e., one or more gNB-CUs of gNBs that control one or more cells that neighbor a cell controlled by the gNB 402 in which the gNB-CU 500 is included). The CU-to-CU message includes one or more of the following parameters:

Load or Interference Indication for Uplink on RACH Resources: This parameter indicates a load or interference perceived on the uplink on RACH resources, e.g., Signal to Interference plus Noise Ratio (SINR) measured on the received msg1 or msgA.

This parameter may be divided into indications of the perceived interference (or load) per time slot and frequency range, e.g., in terms of bandwidth part (BWP) or subcarriers. This allows the gNB-CU 500 receiving the information to compare the indications of perceived interference in a neighbor cell with activities in the corresponding time-frequency resources in a cell owned (i.e., controlled) by the gNB-CU 500, e.g., to find out whether the PRACH transmissions in the controlled cell causes significant interference in the neighboring cell.

Interference Indication for Uplink on Entire Carrier Frequency Range: This parameter indicates interference as perceived on the uplink on the entire carrier frequency range.

This parameter may be divided into indications of the perceived interference per time slot and frequency range, e.g., in terms of BWP or subcarriers. This allows the gNB-CU 500 receiving the information to compare the indications of perceived interference in a neighbor cell with activities in the corresponding time-frequency resources in a cell owned (i.e., controlled) by the gNB-CU 500, e.g., to find out whether the PRACH transmissions in the controlled cell causes significant interference in the neighboring cell.

RACH Resource Allocation: This parameter indicates RACH resource allocation associated to downlink reference signal beams, such as Synchronization Signal Block (SSB) beams or Channel State Information Reference Signal (CSI-RS) beams, in neighboring cells.

RACH Performance: This parameter provides information associated to RACH performance associated to neighboring cells or to the coverage area of downlink reference signal beams, such as SSB beams or CSI-RS beams, transmitted in neighboring cells. Such information could comprise:

Information associated to 2-step RACH and/or 4-step RACH failure/success for UEs in neighboring cells; and/or Information associated to 2-step RACH and/or 4-step RACH failure/success for UEs in the coverage area of downlink reference signal beams (such as SSB beams or CSI-RS beams) transmitted in neighboring cells; and/or Statistical information associated to 2-step RACH and/or 4-step RACH failure/success for UEs in the coverage area of downlink reference signal beams (such as SSB beams or CSI-RS beams) transmitted in neighboring cells. In one embodiment this statistical information may be a distribution function of access and delay probability for 2-step RACH and 4-step RACHs. In yet another embodiment, this statistical information can be success probability (i.e., success per number of attempts). In yet another embodiment statistical information related to 2-step RACH and 4-step RACH performance can be reported and received per beam level. In yet another embodiment, in case of 2-step RACH, statistical distribution information can be associated to the RACH resources as well as statistical distributions related to the PUSCH channels used to transfer payload part of msgA; and/or Information associated to the detection of 2-step RACH and/or 4-step RACH configuration conflict reported for neighboring cells; and/or Beam relation information of the neighboring cells. This can be useful in detection of potential resource conflict between neighboring beams.

Latest Reported Measurement: At handover, when the concerned gNB-CU 500 is a target gNB-CU, receiving information from the source gNB-CU about the latest Reference Signal Received Power (RSRP) measurement reported by the UE to the source gNB-CU, wherein the latest RSRP measurement is related to the target cell which is hosted by a gNB-DU 502 owned by the concerned gNB-CU 500.

Step 602: The gNB-CU 500 receives a UE-to-CU message from UEs, including one or more of the following parameters:

RACH Report: RACH report associated to the cell hosted by the concerned gNB-DU 502. With the currently specified rach-Report IE in LTE Radio Resource Control (RRC) (transmitted from a UE to an eNB in a UEInformationResponse RRC message upon request from the eNB in a UEInformationRequest RRC message) as the baseline, such a report could be extended to provide richer, more detailed and nuanced information. The extended information could also be incorporated into the Minimization of Drive Tests (MDT)/logged measurement framework (specified for LTE but not (yet) for NR) or a similar framework for UEs to collect data and report it to the network. Such rich/extended data could for instance include:

The number of preambles transmitted on average per RACH procedure (i.e., until success or failure of the random access). This may be divided per random access (RA) type (i.e., per 2-step RACH and 4-step RACH respectively). And/or The number of times msgA-TransMax-r16 was reached or exceeded during a certain (preferably recent) time period. And/or The fraction of initiated 2-step RACH procedures in which msgA-TransMax-r16 was reached or exceeded during a certain (preferably recent) time period, or as an exponential average. And/or The number of times preambleTransMax-r16 or preambleTransMax was reached or exceeded during a certain (preferably recent) time period. And/or The fraction of initiated 2-step RACH procedures in which preambleTransMax-r16 or preambleTransMax was reached or exceeded (possibly after switching from 2-step RACH to 4-step RACH) during a certain (preferably recent) time period, or as an exponential average. And/or The number of times the UE switched from 2-step RACH to 4-step RACH during a certain (preferably recent) time period. And/or The frequency of initiated random access procedures, e.g. as an average during a certain (preferably recent) time period or as an exponential average. This may be divided per RACH type (i.e., per 2-step RACH and 4-step RACH respectively). And/or The frequency of successfully concluded random access procedures, e.g. as an average during a certain (preferably recent) time period or as an exponential average. This may be divided per RACH type (i.e., per 2-step RACH and 4-step RACH respectively). And/or The frequency of failed random access procedures, e.g. as an average during a certain (preferably recent) time period or as an exponential average. This may be divided per RACH type (i.e., per 2-step RACH and 4-step RACH respectively). And/or The number of times when RACH type selection was performed and resulted in 2-step RACH (i.e., the number of times the measured RSRP exceeded the RACH type selection threshold msgA-RSRP-Threshold-r16) or the number of times when RACH type selection was performed and resulted in 4-step RACH (i.e., the number of times the measured RSRP did not exceed the RACH type selection threshold msgA-RSRP-Threshold) or both during a certain (preferably recent) time period. And/or The fraction of the of the RACH type selections performed during a certain time (preferably recent) time period that resulted in 2-step RACH and/or the fraction of the RACH type selections performed during a certain time (preferably recent) time period that resulted in 4-step RACH. An alternative to a certain (preferably recent) time period for measurement/collection of data is to provide the information in the form of a sliding average, e.g. an exponential average. And/or The number of failed contention resolutions, e.g. divided per RA type and/or a compound number for both RA types combined, during a certain (preferably recent) time period. And/or The fraction of contention resolutions that failed, e.g. divided per RA type and/or for both RA types combined, calculated during a certain (preferably recent) time period or calculated as a sliding average, e.g. an exponential average. And/or Measurement period or period for collection of data. And/or Timestamp or time periods and/or location stamps (cell ID or geographical coordinates) for various measurement samples. And/or Cell-based and/or Beam-based Measurement Report: Cell-based and/or beam-based measurement report associated to the cell hosted by the concerned gNB-DU.

Step 604: The gNB-CU 500 configures one or more UEs to collect and report the kind of data described above. The configuration could be valid for a certain time, within a certain area and/or until further notice (i.e., until explicitly deactivated). The reports from the UEs could be gathered by the gNB performing the configuration or by any gNB or it could be collected by a centralized entity, e.g., an Operation and maintenance entity for further distribution to concerned gNBs, possibly after processing, refinement and/or modification or selection/pruning of the data. The configuration could be performed via RRC messaging. Reporting could be configured to be performed e.g.:

On request from the network, e.g., using an RRC message; and/or

Periodically; and/or

Every time the UE enters RRC_CONNECTED state; and/or

Every time the UE enters RRC_CONNECTED state in the cell where the UE was configured or in a cell controlled by the same gNB; and/or When the UE enters RRC_CONNECTED state and a certain amount of data has been collected or a certain number of measurement or data collection events have occurred; and/or When the UE enters RRC_CONNECTED state in the cell where the UE was configured or in a cell controlled by the same gNB and a certain amount of data has been collected or a certain number of measurement or data collection events have occurred; and/or When the UE enters RRC_CONNECTED state and a significant change in the collected data has occurred since the preceding report (or if this is the first report); and/or When the UE enters RRC_CONNECTED state in the cell where the UE was configured or in a cell controlled by the same gNB and a significant change in the collected data has occurred since the preceding report (or if this is the first report).

Step 606: The gNB-CU 500 collects statistical information about the RSRP/Reference Signal Received Quality (RSRQ)/Received Signal Strength Indication (RSSI)/SINR measurements reported to the gNB-CU, e.g. one or more information elements in the group of:

The average/minimum/maximum RSRP/RSRQ/RSSI/SINR experienced in the cell or in the coverage area of downlink reference signals beams, such as per SSB beam coverage area or per CSI-RS beam coverage area; and/or The deviation (such as standard deviation or statistical variance) of RSRP/RSRQ/RSSI/SINR experienced in the cell or per SSB beam coverage area or per CSI-RS beam coverage area, from a certain value such as the average/minimum/maximum RSRP/RSRQ/RSSI/SINR experienced; and/or The occurrences of measured RSRP/RSRQ/RSSI/SINR values for a cell or for a SSB beam coverage area or for a CSI-RS beam coverage area which exceed or are smaller than a certain threshold or within certain range(s) of values.

Step 608: The gNB-CU 500 determines, on the basis of the information received in above steps, assistance information for the 2-step RACH and/or 4-step RACH resource configuration in the cell controlled by the concerned gNB-DU 502, which may comprise one or more information elements in the group of:

Information that indicates whether a 2-step RACH and/or a 4-step RACH may be configured for the cell associated to the concerned gNB-DU or for one or more downlink reference signal beam (such as SSB beam or CSI-RS beam) transmitted in the cell associated to the concerned gNB-DU; and/or Depending on the RSRP/RSRQ/RSSI/SINR experienced in the coverage area of downlink reference signal beams, the downlink reference signal beams (such as SSBs beams or CSI-RS beams) that may benefit of 2-step RACH and/or 4-step RACH; and/or An RSRP/RSRQ/RSSI/SINR value threshold that maybe adopted by the UE to determine whether to select the 2-step RACH or the 4-step RACH type.

Step 610: The gNB-CU 500 transmits, to the concerned gNB-DU 502, a CU-to-DU message comprising assistance information for the 2-step RACH and/or 4-step RACH resource configuration in the cell controlled by the concerned gNB-DU, which may comprise one or more information elements in the group of:

A flag indicating a preference on whether to configure the 2-step RACH resources and/or the 4-step RACH resources; and/or An indication of suggested ratio between 2-step RACH resources and 4-step RACH resources; and/or An indication of whether shared or separate 2-step RACH and 4-step RACH occasions are recommended (or required); and/or An RSRP/RSRQ/RSSI/SINR value threshold per cell or per beams (e.g., SSB beams or CSI-RS beams) to be adopted by the UE to determine whether to select the 2-step RACH or the 4-step RACH type; and/or Statistics about the RSRP/RSRQ/RSSI/SINR measurements reported to the gNB-CU associated to a radio cell controlled by the gNB-DU; and/or Statistical information about each 2-step RACH or 4-step RACH procedure performance at the neighboring cells or neighboring beams such as access delay probability distribution or success probability. This information can be signaled per cell level or per beam (e.g., SSB beam or CSI-RS beam) level; and/or Statistics about the RSRP/RSRQ/RSSI/SINR measurements reported to the gNB-CU associated to the coverage area of downlink reference signal beams (such as SSB beams or CSI-RS beams) for a radio cell controlled by the gNB-DU; and/or For some or all cells served by the concerned gNB-DU, levels of interference experienced by cells neighboring such cell, for example interference for msg1 and/or msgA.

Step 612: The gNB-CU 500 transmits, to the UE, a dedicated message (e.g., an RRC message) and/or a broadcast message (e.g., a System Information Block (SIB) message) reflecting information associated to the RACH resources adjustment for 2-step RACH and/or 4-step RACH procedure, when any adjustment happened at gNB-DU 502 or gNB-CU 502.

As an example of dedicated signaling, at release with redirect to a different NR frequency, a UE might be configured to use 2-step RACH either blindly or if the measured RSRP level of the target is above a configured threshold.

This may include transmitting a message on the paging channel (i.e., a DCI addressed to the Paging Radio Network Temporary Identifier (P-RNTI)), e.g. in the form of a DCI containing a "short message" with an indication that system information will be updated at the start of the next system information modification period.

Figure 7:
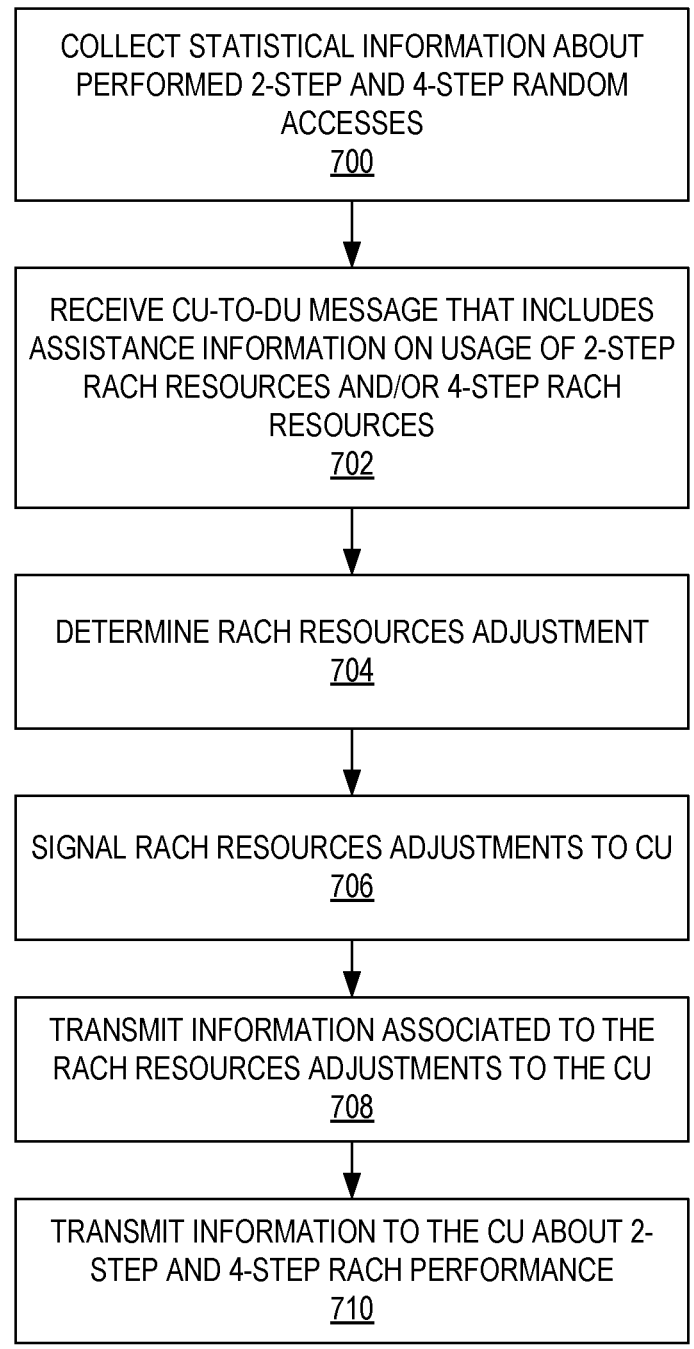
FIG. 7 is a flow chart that illustrates a process performed by the gNB Distributed Unit (gNB-DU) in accordance with some embodiments of the present disclosure.

Embodiments of a method performed at the concerned gNB-DU 502 are also disclosed. In this regard, FIG. 7 is a flow chart that illustrates a process performed by the gNB-DU 502 in accordance with some embodiments of the present disclosure. Note that not all of the illustrated steps are required. The process may include any one of the illustrated steps or any combination two or more of the illustrated steps. As illustrated in FIG. 7, the process performed by the gNB-DU 502 includes:

Step 700: The gNB-DU 502 collects statistics about performed 2-step and 4-step random accesses, some of which may be also included in a DU-to-CU message, while some others are only stored in the gNB-DU 502, e.g.:

The interference measured over the PRACH resources for the 2-step RACH and 4-step, e.g. high, low, medium; and/or The resource utilization of the 4-step RACH resources, e.g. how many UEs performed random access using the 4-step RACH scheme within a certain time period, the type and number of 4-step-RACH resources used; and/or The resource utilization of the 2-step RACH resources, e.g. how many UEs performed random access using the 2-step RACH scheme within a certain time period, the type and number of 2-step-RACH resources used; and/or Statistical information about each 2-step RACH and 4-step RACH procedure performance at the serving cells or serving beams such as access delay probability distribution or success probability. This information can be signaled per cell level or per beam (e.g., SSB beam or CSI-RS beam) level; and/or The information related to RACH performance, e.g. success/unsuccess RACH attempts for UE in a given cell, for 2-step RACH and 4-step RACH, the frequency of RACH success/failed attempt, etc.; and/or Information associated to the detection of 2-step RACH configuration conflicts with neighboring cells;

PRACH Configuration conflict related information can indicate time/frequency or rootSequenceIndex related conflicts or conflict at PUSCH resources configurations used for transmitting payload of msgA; and/or Information associated to the detection of 4-step RACH configuration conflicts with neighboring cells.

Step 702: The gNB-DU 502 receives a CU-to-DU message containing assistance information on the usage of 4-step RACH, 2-step RACH resources.

Step 704: The gNB-DU 502 determines, on the basis of the collected information at the gNB-DU 502 and/or assistance information received in the CU-to-DU message, a RACH resources adjustment for 2-step RACH and/or 4-step RACH procedure. The RACH resources adjustment for 2-step RACH and/or 4-step RACH procedure may comprise one or more in the group of:

Whether to Configure/Deconfigure one of 2-step RACH or 4-step RACH resources for a cell controlled by the gNB-DU 502 or for the coverage area of specific downlink reference signals beams, such as SSB beams or CSI-RS beams, transmitted in a cell controlled by the gNB-DU 502, How many time/frequency resources to configure for the 4-step RACH and 2-step RACH, e.g. the PRACH configuration index, the number of PRACH occasions multiplexed in the frequency domain in one time instance, the average number of slots or symbols allocated to PRACH in a radio frame or slot, Whether to reconfigure one of 2-step RACH or 4-step RACH resources providing a different time/frequency resource allocation, e.g. a different PRACH configuration index, different FDM pattern, increase/decrease the number of SSBs/CSI-RS for random access occasions, increase/decrease the number of random access occasion per SSB/CSI-RS beam; and/or Change the RSRP/RSRQ/RSSI/SINR value threshold to be adopted by the UE to determine whether to select the 2-step RACH or the 4-step RACH report.

Step 706: The gNB-DU 502 signals, to the gNB-CU 500, any adjustment in 2-step RACH and 4 step RACH resources mentioned above in previous step.

Step 708: The gNB-DU 502 transmits, to the gNB-CU 500, information associated to the RACH resources adjustment for 2-step RACH and/or 4-step RACH procedure according to the previous step. Note that, in one embodiment, step 706 relates to sending information that is directly related to RACH resources, whereas step 708 relates to sending information that is indirectly related to RACH resources. Also, in one embodiment, steps 706 and 708 may be merged. Further, in another embodiment, only information directly related to RACH resources is sent. In yet another embodiment, only information indirectly related to RACH resources is sent. In another embodiment, both may be sent.

Step 710: The gNB-DU 502 transmits, to the gNB-CU 500, information about 2-step RACH and 4-step RACH performance in terms of statistical distribution of access and delay probability.

In yet another embodiment, statistical information related to 2-step RACH and 4-step RACH performance can be signaled per beam level.

Actions Taken by a gNB-CU

On the basis of the measurement reports transmitted by the UEs in a cell and collected at the gNB-CU 500, as well as possible DU-to-CU messages and CU-to-CU messages, the gNB-CU 500 may provide assistance information to aid the gNB-DU 502 in properly setting the 2-step RACH and 4-step RACH resources (e.g., steps 608 and 610 of FIG. 6). In this regard, the embodiments described below regarding actions taken by the gNB-CU 500 may be implemented in steps 608 and 610 of FIG. 6, as an example. However, these embodiments are not limited thereto. In the following, we typically refer to RSRP measurements, but methods can be extended to any other type of measurement which is transmitted by the UE 412 to the gNB 402, e.g., RSRQ/RSSI/SINR, etc.

The CU-to-DU message may be transmitted periodically, or when there is a significant change in the information therein contained.

In a first embodiment, depending on cell-based measurements or beam-based measurements received from UE 412, the gNB-CU 500 may suggest the gNB-DU 502 only configuring 2-step RACH and/or 4-step RACH resources for the cell or for an SSB (e.g., as part of the assistance information for 2-step RACH and/or 4-step RACH configuration). For example, if the average RSRP experienced by UEs in the cell is above a certain value A, the gNB-CU 500 indicates that 2-step RACH can be used for the cell or for an SSB beam or group of SSB beams. If the average RSRP is below the value A, the gNB-CU 500 indicates that only 4-step RACH should be used in the cell or in the SSB beam or group of SSB beams. In an alternative of this embodiment, a further threshold value B is introduced, so that if the average RSRP is below the value A and above a value B, the gNB-CU 500 indicates that both 2-step RACH and 4-step RACH can be used, whereas only 4-step RACH usage is indicated if the RSRP is below threshold B. The same method can be used in a similar way to indicate a recommended/required relation between the amount of resources allocated to 2-step RACH and 4-step RACH respectively, e.g. depending on where the obtained RSRP is within the range between value A and value B. In these embodiments, the RSRP may be an average calculated from reports from multiple UEs in different parts of the cell (e.g., different SSB beams or group of SSB beams) during a certain period of time, e.g. the most recent time period T, or it may be an average where recent measurements are given higher weight, e.g. an exponential average). Other examples of RSRP values include e.g., the 5-percentile, where this may be used to indicate that the cell could manage with only 2-step RACH resources (i.e., without 4-step RACH resources).

In a second embodiment, the gNB-CU 500 uses the occurrences of measured RSRP values for a cell or for the downlink coverage area of SSB beams or CSI-RS beams transmitted in the cell. For example, if very few occurrences of RSRP are measured above the value A, the gNB-CU 500 does not suggest the gNB-DU 502 using the 2-step RACH scheme (e.g., as part of the assistance information for 2-step RACH and/or 4-step RACH configuration). Similar, for the case of few occurrences below the value B.

In a third embodiment, the value A disclosed above is the msgA-RSRP-Threshold (also called msgA-RSRP-Threshold-r16) that the gNB-DU 502 intends to use if the 2-step RACH resources are to be used, i.e. the gNB-CU 500 suggests the gNB-DU 502 only allocating 4-step RACH resources (e.g., as part of the assistance information for 2-step RACH and/or 4-step RACH configuration) if the average RSRP is below the msgA-RSRP-Threshold, or if the RSRP occurrences above msgA-RSRP-Threshold are fewer than a certain value.

In a fourth embodiment, the gNB-CU 500, on the basis of the aforementioned received measurements, suggests increasing or decreasing the amount of resources allocated to the 2-step RACH procedure or to the 4-step RACH procedure (e.g., as part of the assistance information for 2-step RACH and/or 4-step RACH configuration). For example, depending on whether the occurrences of RSRP values above the threshold value A is low/medium/high (e.g., with respect to a certain value configured at the gNB-CU), the gNB-CU 500 may indicate to gNB-DU 502 the amount of time/frequency resources to be allocated to 2-step RACH, or whether to increase/decrease the time/frequency resources currently allocated to 2-step RACH. Alternatively, depending on whether the occurrences of RSRP values above the threshold value A is low/medium/high, the gNB-CU 500 signals to the gNB-DU 502 the expected 2-step RACH resource utilization. The same approach may be used for the 4-step RACH depending on the RSRP values measured below threshold value A (or B).

In a fifth embodiment, depending on SSB and/or CSI-RS beam-based measurements received from UE, the gNB-CU 500 may indicate for which SSBs it is preferable to adopt the 2-step RACH or the 4-step RACH (e.g., as part of the assistance information for 2-step RACH and/or 4-step RACH configuration). For example, the gNB-CU 500 may indicate the SSBs for which the RSRP is above a value A, and/or between a value A and value B, and/or below the value B.

In a sixth embodiment, the gNB-CU 500 suggests the gNB-DU 502 adopting a different RSRP threshold for the UE to select either the 2-step RACH or the 4-step RACH, e.g. a different msgA-RSRP-Threshold (e.g., as part of the assistance information for 2-step RACH and/or 4-step RACH configuration). For example, depending on the value of msgA-RSRP-Threshold currently configured by the gNB-DU 502 and from the measured RSRP measured by the gNB-CU 500 for the cell/beam, the gNB-CU 500 may suggest lowering the msgA-RSRP-Threshold if the average RSRP is below the msgA-RSRP-Threshold, or if the most occurring ranges/values of RSRPs are below the msgA-RSRP-Threshold. This would allow the gNB-DU 502 to enlarge the probability for the UE to select the 2-step RACH.

In a seventh embodiment, the gNB-CU 500 takes into account CU-to-CU messages, e.g. related to load/interference detected in neighboring cells. For example, if the neighboring cells interference is high as indicated in the CU-to-CU message, the concerned gNB-CU 500 may indicate to the gNB-DU 502 (e.g., as part of the assistance information for 2-step RACH and/or 4-step RACH configuration) to increase the msgA-RSRP-Threshold, thereby reducing the coverage area of 2-step RACH and hence reducing interference towards neighboring cells and at the same time increasing the probability of successful step-2 RA.

In another variant of this embodiment, in case the load in a neighboring cell is high, the concerned gNB-CU 500 may indicate to the gNB-DU 502 (e.g., as part of the assistance information for 2-step RACH and/or 4-step RACH configuration) to configure more RACH resources, either 2-step or 4-step (e.g., depending on the RSRP value experienced at cell edges), or to increase the time/frequency resources currently allocated to 4-step/2step RACH. That is because, if the load in neighboring cell is high, it might be due to the fact that the allocation of RACH resources in the concerned gNB-DU 502 is poor, e.g. due to too high msgA-RSRP-Threshold threshold, too few RACH resources allocated which implies the UE performing RACH on neighboring cells.

In yet another variant of this embodiment, receiving a CU-to-CU message indicating high interference in a neighboring cell may trigger the gNB-CU 500 to decrease the indicated initial transmission power for a 2-step RACH and/or 4-step RACH preamble and/or the msgA PUSCH transmission (i.e., the PUSCH payload of msgA) (e.g., as part of the assistance information for 2-step RACH and/or 4-step RACH configuration). This may also involve adapting an offset in the initial transmission power between a 2-step RACH preamble and the associated msgA PUSCH transmission. The gNB-CU 500 may do this itself, by altering the relevant parameter(s) in the system information, which are used in the pathloss based formula for calculation of the initial RA transmission power, or the gNB-CU 500 may instruct the gNB-DU 502 to do it. Furthermore, the gNB-CU 500, with or without assistance from the gNB-DU 502, may also use the interference information received from a neighboring gNB-CU 500 to modify the transmission power ramping step, i.e. the step with which a UE increases the transmission power for each new RA attempt (after a preceding failed attempt). For instance, receiving an indication of high interference in a neighbor cell may trigger the gNB-CU 500 to decrease the transmission power ramping step.

In an eighth embodiment, the concerned gNB-CU 500 is a target CU at handover. The concerned gNB-CU 500 receives the latest RSRP measurement related to the target cell hosted by the concerned gNB-DU 502 and owned by the concerned gNB-CU 500. On the basis of such RSRP measurement, the concerned gNB-CU 500 provides a suggestion (e.g., as part of the assistance information for 2-step RACH and/or 4-step RACH configuration) of whether to allocate 2-step CFRA (or CBRA) resources or 4-step CFRA (or CBRA) resources to perform random access on the target cell, including additional RACH properties, such as the number or density of RACH occasions and which SSB beams or CSI-RS beams to associate the RACH occasions and CFRA preambles with. The gNB-CU 500 may also suggest or mandate certain values of configuration parameters related to PRACH/PUSCH transmission power and/or maximum allowed number of PRACH/PUSCH transmission attempts during the RA procedure in the target cell, either by setting the values of the concerned parameters itself, or by instructing or recommending the target gNB-DU to do it. Such parameters may, e.g., include the msgA-PreamblePowerRampingStep-r16, msgA-PreambleReceivedTargetPower-r16, msgA-TransMax-r16 and/or preambleTransMax-r16 parameter included in the rach-ConfigGenericTwoStepRA-r16 IE in the RACH-ConfigDedicated IE. The interference information received from a neighbor gNB-CU may be divided based on time and frequency information, e.g. in terms of which time slots and which frequency range (e.g., in terms of subcarriers), so that the perceived interference may be associated with certain times and frequencies. If such richer interference information is provided, the receiving gNB-CU may determine if the interference in a neighbor cell is particularly high or particularly low in the time-frequency radio resources allocated to PRACH and/or msgA PUSCH in the one of the gNB-CU's cells that is concerned and adapt the RACH configuration accordingly.

In a ninth embodiment, the gNB-CU 500 only signals to the gNB-DU 502 (e.g., as part of the assistance information for 2-step RACH and/or 4-step RACH configuration) the statistics related to RSRP measured in the beam/cell and the load/interference experienced in the neighboring cells, and lets the gNB-DU 502 make the above disclosed decisions.

In a tenth embodiment, the gNB-CU 500 may take into account the UE RRC state when determining its preference for the 2-step RACH or 4-step RACH (e.g., provided as part of the assistance information for 2-step RACH and/or 4-step RACH configuration). For example, the gNB-CU 500 may:

Consider the opportunity to statically/semi-statically/dynamically configure that use of 2-step RACH is allowed, prohibited, encouraged (e.g., by decreasing the msgA-RSRP-Threshold-r16 parameter) or discouraged (e.g., by increasing the msgA-RSRP-Threshold-r16 parameter) (temporarily or not) based on UE RRC state when random access is attempted. As an example, 2-step RACH maybe preferred for UEs in RRC_INACTIVE compared to RRC_IDLE (e.g., if the random access is attempted in response to a RAN Paging or a 5GC Paging). The configuration may be based, e.g., on associated performance (such as attempt, success, success rate, number of overload indications) or as a result of trained algorithms. To this end, the gNB-CU may provide to the UE different sets of 2-step RACH and/or 4-step RACH resources that the UE shall use depending on its RRC state. Another example of UE state dependent configuration or 2-step RACH and/or 4-step RACH resources and related parameter (e.g., for selection of RA type) is that UEs in RRC_CONNECTED state may be provided with one configuration while UEs in RRC_IDLE or RRC_INACTIVE state may be provided with another configuration. For instance, UEs in RRC_CONNECTED state may receive msgA PUSCH resource allocations which are larger than the msgA PUSCH resource allocations used by UEs in RRC_IDLE or RRC_INACTIVE state. These two msgA PUSCH resource allocation sizes may be reflected in two preamble groups, preamble group A and B with associated respective msgA PUSCH resource allocations.

Possibly differentiate the use of 2-step RACH compared to 4-step RACH for UEs in RRC_INACTIVE depending if full I-RNTI or short-I-RNTI is expected in resume attempts according to SIB1 configuration (i.e., indirectly addressing different potential coverage areas for resume attempts).

In an eleventh embodiment, the gNB-CU 500 may take into account the service that the UE intends to transmit when determining its preference for the 2-step RACH or 4-step RACH (e.g., provided as part of the assistance information for 2-step RACH and/or 4-step RACH configuration). For example, the gNB-CU may:

Consider the opportunity to statically/semi-statically/dynamically configure that use of 2-step RACH is allowed, prohibited, encouraged, e.g., by decreasing the msgA-RSRP-Threshold-r16 parameter) or discouraged, e.g., by increasing the msgA-RSRP-Threshold-r16 parameter) (temporarily or not) based on urgency conditions and/or service-related attributes. The configuration may be based, e.g., on associated performance (such as attempt, success, success rate, number of overload indications) or as a result of trained algorithms. To this end, the gNB-CU may provide to the UE different set of 2-step RACH and/or 4-step RACH resources that the UE shall use depending on the service the UE intends to transmit. For a UE in RRC_CONNECTED state, this may, e.g., depend on the 5QI or logical channel of the highest priority data the UE has currently in the buffer or based on the App ID of running applications. For UE's in RRC_IDLE and RRC_INACTIVE UEs the service-based RACH resource, RACH configuration or RA type selection may be performed autonomously by the UE, based on the application/service that triggered the UE to initiate random access and configured instructions/rules provided by the network.

As an example, allow the UEs to use 2-step RACH in case of mobility in combination with a specific 5QI, which can be configured in the RACH-ConfigDedicated IE in the Handover Command, and use 4-step RACH in case of initial access.

Consider the use 2-step RACH in combination with additional functionalities.

An example may be the use of grant-free transmission.

Another example may be the serving cell being configured as supplementary uplink.

In a twelfth embodiment, the gNB-CU 500 takes into account the network slices supported by cells of the gNB-DU (e.g., when determining the assistance information for 2-step RACH and/or 4-step RACH configuration). Namely, for a given cell, supporting a given set of network slices each identified by an S-NSSAI, the gNB-CU provides an indication, per S-NSSAI of whether usage of 2-step RACH or 4-step RACH is recommended. The latter can be due to, e.g., whether services of a network slice require shortest access time (and therefore shorter RACH procedures) or whether services of a network slice require high robustness for access (and therefore less likelihood of RACH message delivery failure).

In one alternative of this embodiment, the gNB-CU provides either alternatively or additionally to the above recommendation, exact targets for, e.g., maximum RACH access procedure duration, or maximum affordable RACH access failure rates.

The above embodiment can be supported by the gNB-CU together with any of the other methods described above in order to provide to the gNB-DU a set of information allowing an educated decision on how to choose between 2-step RACH and 4-step RACH.

Actions Taken by a gNB-DU

The embodiments described below regarding actions taken by the gNB-DU 502 may be implemented in respective steps of the process of FIG. 7, as an example. However, these embodiments are not limited thereto.

In a first embodiment, the gNB-DU 502 performs the actions disclosed above for the gNB-CU 500 in case the gNB-DU 502 is only provided with statistics related to RSRP measured at the gNB-CU 500, i.e. in case the seventh embodiment above is adopted.

In a second embodiment, the gNB-DU 502 takes into account the information received in the CU-to-DU message, and compares or combines that with information locally available at the gNB-DU 502, e.g.

The interference measured over the PRACH resources (or more in general over the UL) for the 2-step RACH and 4-step RACH. Due to the imbalance between UL/DL coverage, the gNB-DU 502 may decide to not allocate 2-step RACH resources if UL interference is high, irrespective of the gNB-CU indication which typically only takes into account the DL. That is because the 2-step RACH may be more susceptible to interference than 4-step RACH.

The resource utilization of the 4-step RACH resources, e.g. how many UEs performed random access using the 4-step RACH scheme within a certain time period. For example, if the 4-step RACH resource utilization is low within a certain time period, the gNB-CU 500 may decide to de-configure 4-step RACH resources, or to increase the msgA-RSRP-Threshold to achieve a better balance between 2-step RACH and 4-step RACH resource utilization.

The resource utilization of the 2-step RACH resources, e.g. how many UEs performed random access using the 2-step RACH scheme within a certain time period. For example, if the 2-step RACH resource utilization is low within a certain time period, the gNB-CU 500 may decide to de-configure 2-step RACH resources, or to decrease the msgA-RSRP-Threshold to achieve a better balance between 2-step RACH and 4-step RACH resource utilization.

The resource utilization of the 4-step RACH resources in relation to the utilization of the 2-step RACH resources, e.g. how many UEs performed random access using the 4-step RACH scheme within a certain time period in relation to the number of UEs performing 2-step RACH during the same time period. For example, if the 4-step RACH resource utilization is low compared to the 2-step RACH resource utilization within a certain time period, the gNB-CU 500 may decide to de-configure 4-step RACH resources (i.e., decrease the allocation of resources to 4-step RACH), or increase the allocated 2-step RACH resources or to increase the msgA-RSRP-Threshold to achieve a better balance between 2-step RACH and 4-step RACH resource utilization.

The information related to RACH performances which can be retrieved from the existing RACH report containing RACH failure information reported from the gNB-CU 500. Or which can be computed locally at the gNB-DU 502, e.g. how many times a fallback indicator indicating the UE to fallback to 4-step RACH have been used during a certain time period, e.g. in relation to how many times 2-step RACH have been successfully performed (i.e., without fallback to 4-step RACH), how many times a backoff indicator indicating the UE to reattempt a 2-step RACH have been used during a certain time period.

Other/further information reported by UEs, probably reported to the gNB-CU 500 and then either forwarded to the gNB-DU 502 or processed in the gNB-CU 500, resulting in an instruction or recommendation (or otherwise condensed information) transmitted from the gNB-CU 500 to the gNB-DU 502. Such information could, e.g., include any of the types of information listed above in the description of what kinds of data a UE could be configured to collect and report to the network.

In a third embodiment, the gNB-DU 502 decides how to partition resources among the 4-step RACH and the 2-step RACH. For example, if the RSRP measured in the cell is very good, the gNB-DU 502 may increase the amount of time frequency resources allocated to the 2-step RACH, by changing the PRACH configuration index, and the number of PRACH occasions multiplexed in the frequency domain in one time instance. Also, the gNB-DU 502 may reduce the number of SSBs associated to a single random access occasion, in order to fully capitalize beam refinement. At the same time, in such case, the gNB-DU 502 may reduce the amount of resource allocated to 4-step RACH, and increase the number of SSBs multiplexed in the same RA occasion since in practice only UEs at cell edge will use 4-step RACH resources and there is less need for 4-step RACH resources.

In an alternative embodiment, the gNB-DU 502 may configure a different RACH resource allocation for different beams depending on their measured RSRP. For example, if a beam has a good measured RSRP, the number of resources allocated for 2-step RACH can be larger (or significantly larger) than the number of resources allocated for 4-step RACH. On the other hand, for a beam with poor measured RSRP, the number of resources allocated for 4-step RACH can be larger (or significantly larger) than the number of resources allocated for 2-step RACH.

In a fourth embodiment, the gNB-DU 502 may initially adopt a very high threshold value A, i.e. a very high msgA-RSRP-Threshold, and progressively reduce it depending on the information received from the gNB-CU 500. For example, if the gNB-CU 500 indicates that the occurrences of RSRP below the threshold value A is higher, the gNB-DU 502 may either de-configure 2-step RACH resources, or reduce the threshold value A. If RACH performance statistics locally available at the gNB-DU 502 shows a degradation of the 2-step RACH performance, the gNB-DU 502 increase the threshold value A, i.e. the msgA-RSRP-Threshold.

In a fifth embodiment, the gNB-DU 502 may use the indications provided by the gNB-CU 500 to allocate 2-step RACH and/or 4-step RACH resources per slice. Namely, the resources allocated and the type of RACH access may be selected for the slice.

Additional Description

Figure 8:
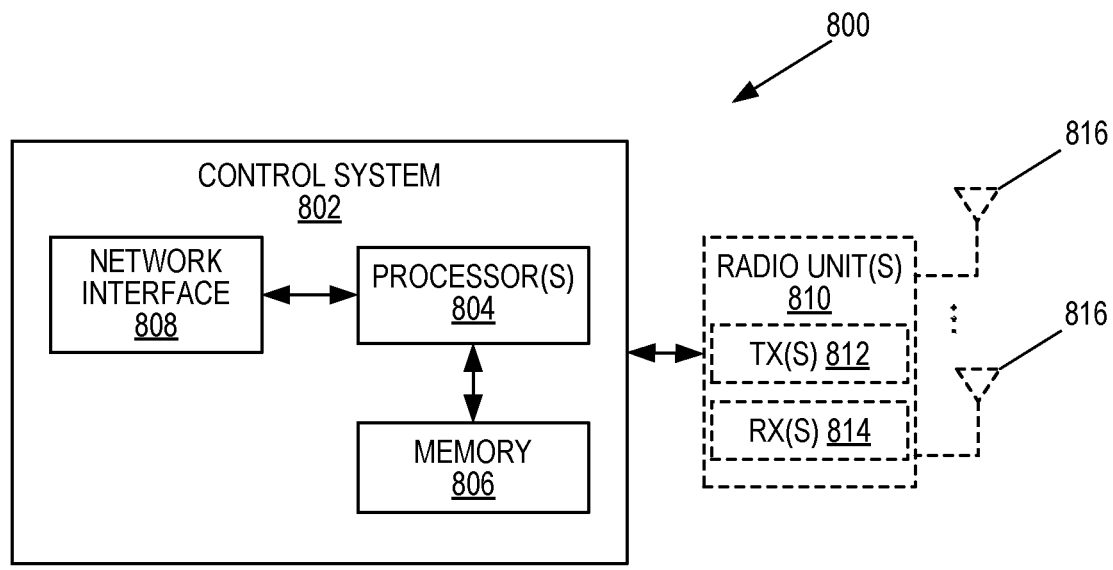
FIGS. 8, 9, and 10 are schematic block diagrams of example embodiments of a network node in which a gNB-CU or gNB-DU may be implemented.

FIG. 8 is a schematic block diagram of a radio access node 800 according to some embodiments of the present disclosure. Optional features are represented by dashed boxes. The radio access node 800 may be, for example, a base station 402 or 406 or a network node that implements all or part of the functionality of the base station 402 or gNB described herein (e.g., a network node that implements the gNB-CU 500 or a network node that implements the gNB-DU 500). As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, particularly if the radio access node 800 is a network node that implements the gNB-DU 502, the radio access node 800 may include one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of the radio access node 800 as described herein (e.g., one or more functions of the gNB-CU 500 or one or more functions of the gNB-DU 502, as described herein). In some embodiments, the function(s) are implemented in software that is stored, e.g., in the memory 806 and executed by the one or more processors 804.

Figure 9:
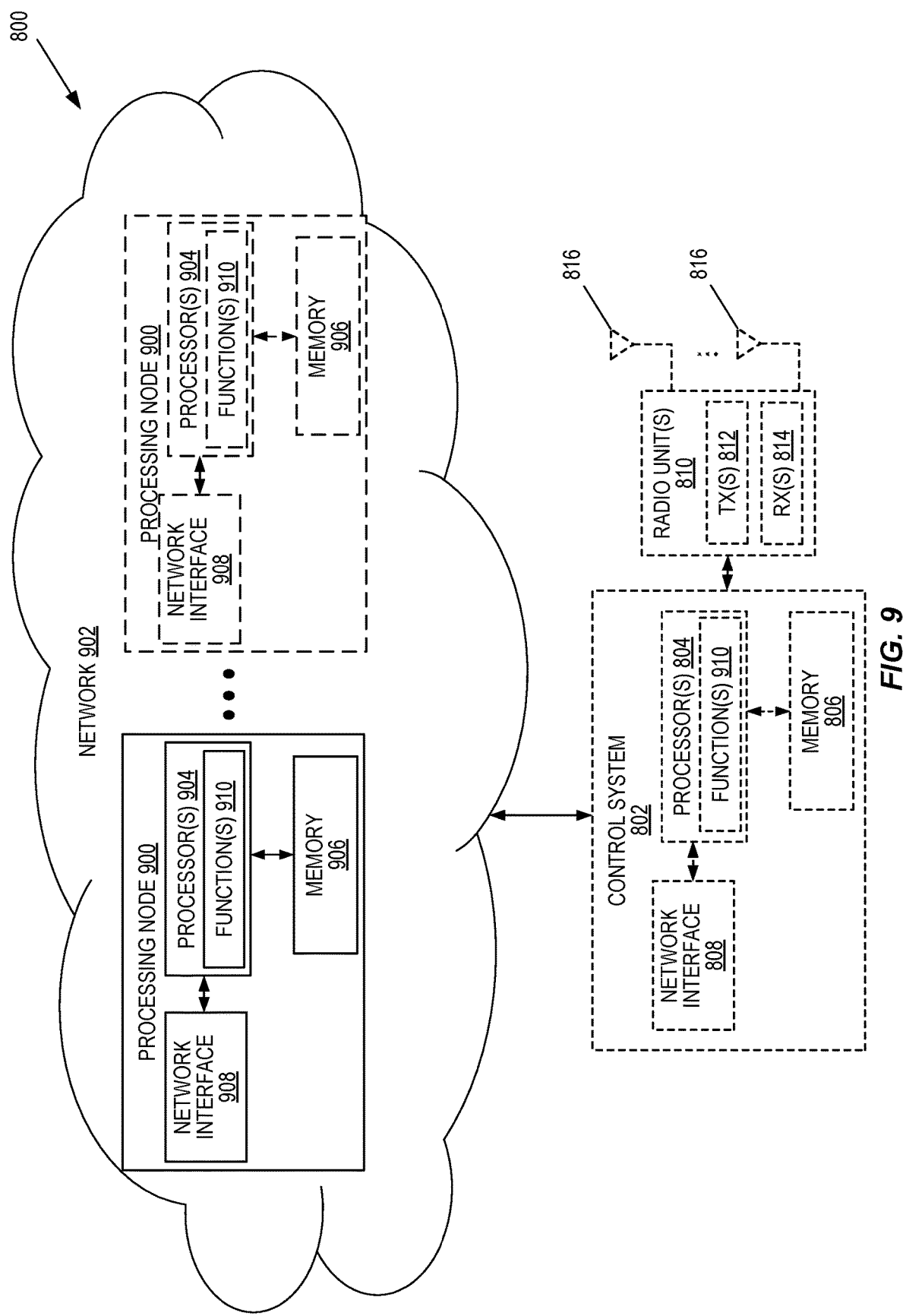

FIG. 9 is a schematic block diagram that illustrates a virtualized embodiment of the radio access node 800 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 may include the control system 802 and/or the one or more radio units 810, as described above. The control system 802 may be connected to the radio unit(s) 810 via, for example, an optical cable or the like. The radio access node 800 includes one or more processing nodes 900 coupled to or included as part of a network(s) 902. If present, the control system 802 or the radio unit(s) are connected to the processing node(s) 900 via the network 902. Each processing node 900 includes one or more processors 904 (e.g., CPUs, ASICs, FPGAs, and/or the like), memory 906, and a network interface 908.

In this example, functions 910 of the radio access node 800 described herein (e.g., one or more functions of the gNB-CU 500 or one or more functions of the gNB-DU 502, as described herein) are implemented at the one or more processing nodes 900 or distributed across the one or more processing nodes 900 and the control system 802 and/or the radio unit(s) 810 in any desired manner. In some particular embodiments, some or all of the functions 910 of the radio access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of radio access node 800 or a node (e.g., a processing node 900) implementing one or more of the functions 910 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
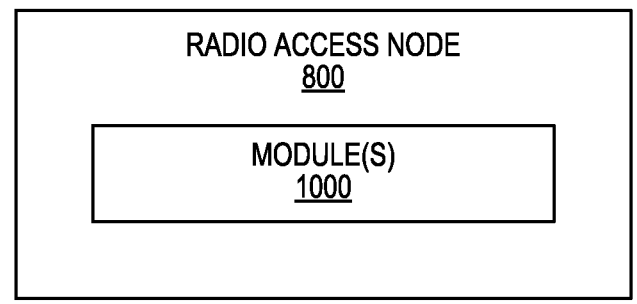

FIG. 10 is a schematic block diagram of the radio access node 800 according to some other embodiments of the present disclosure. The radio access node 800 includes one or more modules 1000, each of which is implemented in software. The module(s) 1000 provide the functionality of the radio access node 800 described herein (e.g., one or more functions of the gNB-CU 500 or one or more functions of the gNB-DU 502, as described herein). This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, (etc.).

Some example embodiments of the present disclosure are as follows:

Embodiment 1: A method performed by a first network node (e.g., a network node that implements a gNB-CU 500), the method comprising: obtaining (600-606) information related to 2-step Random Access Channel, RACH, and/or 4-step RACH configurations for a cell(s) and/or a beam(s) controlled by the first network node; determining (608), based on the obtained information, first assistance information for the 2-step RACH and/or 4-step RACH configuration for the cell(s) and/or the beam(s); transmitting (610), to a second network node (e.g., a network node that implements a gNB-DU 502), second assistance information for the 2-step RACH and/or 4-step RACH configuration for the cell(s) and/or the beam(s), the second assistance information comprising the first assistance information or information that indicates one or more parts of the first assistance information.

Embodiment 2: The method of embodiment 1 wherein the first assistance information for the 2-step RACH and/or 4-step RACH configuration for the cell comprises:
 a) information that indicates whether a 2-step RACH and/or a 4-step RACH may be configured for the cell
 b) information that indicates whether a 2-step RACH and/or a 4-step RACH may be configured for one or more downlink reference signal beam (e.g., SSB beam(s) or CSI-RS beam(s)) transmitted in the cell;
 c) information that indicates one or more downlink reference signal beams (e.g., SSB beam(s) or CSI-RS beam(s)) that may benefit from 2-step RACH and/or 4-step RACH;
 d) a measurement value threshold that may be adopted by a UE to determine whether to select the 2-step RACH or the 4-step RACH type; or
 e) a combination of any two or more of (a)-(d).

Embodiment 3: The method of embodiment 1 or 2 wherein the second assistance information for the 2-step RACH and/or 4-step RACH configuration for the cell comprises:
 i. an indication of a preference on whether to configure 2-step RACH resources and/or 4-step RACH resources for the cell;
 ii. an indication of a suggested ratio between 2-step RACH resources and 4-step RACH resources for the cell;
 iii. an indication of whether shared or separate 2-step RACH and 4-step RACH occasions are recommended or required;
 iv. a measurement value threshold for the cell to be adopted by a UE to determine whether to select the 2-step RACH or the 4-step RACH type
 v. a measurement value threshold for one or more beams to be adopted by a UE to determine whether to select the 2-step RACH or the 4-step RACH type;
 vi. statistical information about measurements reported to the first network node;
 vii. statistical information about 2-step RACH or 4-step RACH procedure performance at one or more neighboring cells and/or one or more neighboring beams;
 viii. statistical information about measurements reported to the first network node associated to a coverage area of downlink reference signal beams for the cell;
 ix. for some or all cells served by the second network node, information that indicates levels of interference experienced by neighboring cells (e.g., interference for msg1 and/or msgA); or
 x. a combination of any two or more of (i)-(ix).

Embodiment 4: The method of any one of embodiments 1 to 3 wherein obtaining (600-606) the information related to 2-step RACH and/or 4-step RACH configurations for the cell(s) and/or the beam(s) controlled by the first network node comprises receiving (600) one or more CU-to-CU messages from one or more CUs of one or more other base stations that control one or more neighboring cells and/or one or more neighboring beams, the one or more CU-to-CU messages comprising at least some of the information.

Embodiment 5: The method of embodiment 4 wherein each CU-to-CU message comprises:
A. information that indicates a load or interference perceived on an uplink on RACH resources comprised in the 2-step RACH and/or 4-step RACH configuration for the cell(s) and/or the beam(s) controlled by the first network node;
B. information that indicates interference as perceived on an uplink on an entire carrier frequency range;
C. information that indicates a RACH resource allocation associated to downlink reference signal beams in a respective neighboring cell(s);
D. information that indicates a RACH performance associated to the respective neighboring cell(s) or to a coverage area of downlink reference signal beams transmitted in the respective neighboring cell(s);
E. one or more measurements reported by a UE(s) on the respective cell(s); or
F. a combination of any two or more of A-E.

Embodiment 6: The method of any one of embodiments 1 to 5 wherein obtaining (600-606) the information related to 2-step RACH and/or 4-step RACH configurations for the cell(s) and/or the beam(s) controlled by the first network node comprises receiving (602) one or more UE-to-CU messages from one or more UEs, the one or more UE-to-CU messages comprising at least some of the information.

Embodiment 7: The method of embodiment 6 wherein the one or more UE-to-CU messages comprise one or more RACH reports and/or one or more cell-based and/or beam-based measurement reports.

Embodiment 8: The method of any one of embodiments 1 to 7 wherein obtaining (600-606) the information related to 2-step RACH and/or 4-step RACH configurations for the cell(s) and/or the beam(s) controlled by the first network node comprises collecting (606) statistical information about measurements reported to the first network node.

Embodiment 9: The method of any one of embodiments 1 to 8 further comprising transmitting (612), to a UE, a message that reflects information associated to a RACH resource adjustment for 2-step RACH and/or 4-step RACH in the cell(s) and/or beam(s).

Embodiment 10: The method of any one of embodiments 1 to 9 wherein the second assistance information comprises information that indicates a requirement or recommendation to only configure 2-step RACH or to only configure 4-step RACH.

Embodiment 11: The method of any one of embodiments 1 to 9 wherein the second assistance information comprises information that indicates a required or recommended relation between an amount of resources allocated to 2-step RACH as compared to an amount of resources allocated to 4-step RACH.

Embodiment 12: The method of any one of embodiments 1 to 9 wherein the second assistance information comprises information that indicates a requirement or recommendation to only configure 2-step RACH, or to only configure 4-step RACH, or to configure both 2-step RACH and 4-step RACH.

Embodiment 13: The method of any one of embodiments 1 to 9 wherein the second assistance information comprises information that indicates a requirement or recommendation to only configure 4-step RACH if an average RSRP is below a msgA-RSRP-Threshold that the second network node intends to use for 2-step RACH.

Embodiment 14: The method of any one of embodiments 1 to 9 wherein the second assistance information comprises information that indicates a requirement or recommendation to increase or decrease an amount of resources allocated to 2-step RACH and/or information that indicates a requirement or recommendation to increase or decrease an amount of resources allocated to 4-step RACH.

Embodiment 15: The method of any one of embodiments 1 to 9 wherein the second assistance information comprises information that indicates a requirement or recommendation to adopt 2-step RACH on one or more particular beams.

Embodiment 16: The method of any one of embodiments 1 to 9 wherein the second assistance information comprises information that indicates a requirement or recommendation to not adopt 2-step RACH on one or more particular beams.

Embodiment 17: The method of any one of embodiments 1 to 9 wherein the second assistance information comprises information that indicates a requirement or recommendation to adopt a new measurement threshold for a UE to select either the 2-step RACH or the 4-step RACH.

Embodiment 18: The method of any one of embodiments 1 to 9 wherein the second assistance information comprises information that indicates a requirement or recommendation to increase a measurement threshold for a UE to select either the 2-step RACH or the 4-step RACH.

Embodiment 19: The method of any one of embodiments 1 to 18 wherein determining the first assistance information comprises determining the first assistance information taking into account an RRC state(s) of a UE(s).

Embodiment 20: The method of any one of embodiments 1 to 18 wherein determining the first assistance information comprises determining the first assistance information taking into account a service(s) that a UE(s) intend to use on the cell(s) and/or beam(s).

Embodiment 21: The method of any one of embodiments 1 to 18 wherein determining the first assistance information comprises determining the first assistance information taking into account a one or more network slices that are supported by the cell(s) of the second network node.

Embodiment 22: A first network node (e.g., a network node that implements a gNB-CU 500), the first network node adapted to: obtain (600-606) information related to 2-step Random Access Channel, RACH, and/or 4-step RACH configurations for a cell(s) and/or a beam(s) controlled by the first network node; determine (608), based on the obtained information, first assistance information for the 2-step RACH and/or 4-step RACH configuration for the cell(s) and/or the beam(s); transmit (610), to a second network node (e.g., a network node that implements a gNB-DU 502), second assistance information for the 2-step RACH and/or 4-step RACH configuration for the cell(s) and/or the beam(s), the second assistance information comprising the first assistance information or information that indicates one or more parts of the first assistance information.

Embodiment 23: The first network node of embodiment 22 wherein the first network node is further adapted to perform the method of any one of embodiments 2 to 21.

Embodiment 24: A first network node (e.g., a network node that implements a gNB-CU 500), the first network node comprising processing circuitry configured to cause the first network node to: obtain (600-606) information related to 2-step Random Access Channel, RACH, and/or 4-step RACH configurations for a cell(s) and/or a beam(s) controlled by the first network node; determine (608), based on the obtained information, first assistance information for the 2-step RACH and/or 4-step RACH configuration for the cell(s) and/or the beam(s); transmit (610), to a second network node (e.g., a network node that implements a gNB-DU 502), second assistance information for the 2-step RACH and/or 4-step RACH configuration for the cell(s) and/or the beam(s), the second assistance information comprising the first assistance information or information that indicates one or more parts of the first assistance information.

Embodiment 25: A method performed by a second network node (e.g., a network node that implements a gNB-DU 502), the method comprising: obtaining (700-702) information related to 2-step Random Access Channel, RACH, and/or 4-step RACH configurations for a cell(s) and/or a beam(s) controlled by a first network node (e.g., a gNB-CU 500); determining (704), based on the obtained information, an adjustment to RACH resources used for the 2-step RACH and/or 4-step RACH in the cell(s) and/or the beam(s); transmitting (706), to the first network node, information that is indicative of the adjustment to the RACH resources used for the 2-step RACH and/or 4-step RACH in the cell(s) and/or the beam(s).

Embodiment 26: The method of embodiment 25 wherein the obtained information comprises statistical information about performed 2-step RACH and 4-step RACH in the cell(s) and/or the beam(s).

Embodiment 27: The method of embodiment 25 or 26 wherein the adjustment to the RACH resources comprises: a configuration of a 2-step RACH or 4-step RACH resource; a de-configuration of a 2-step RACH or 4-step RACH resource; an adjustment of an amount of time/frequency resources are configured for 2-step RACH; an adjustment of an amount of time/frequency resources are configured to 4-step RACH; a reconfiguration of 2-step RACH resources providing a different time/frequency resource allocation; a reconfiguration of 4-step RACH resources providing a different time/frequency resource allocation; and/or a change in a measurement value threshold to be adopted by a UE to determine whether to select 2-step RACH or 4-step RACH.

Embodiment 28: A second network node (e.g., a network node that implements a gNB-DU 502), the second network node adapted to: obtain (700-702) information related to 2-step Random Access Channel, RACH, and/or 4-step RACH configurations for a cell(s) and/or a beam(s) controlled by a first network node (e.g., a gNB-CU 500); determine (704), based on the obtained information, an adjustment to RACH resources used for the 2-step RACH and/or 4-step RACH in the cell(s) and/or the beam(s); transmit (706), to the first network node, information that is indicative of the adjustment to the RACH resources used for the 2-step RACH and/or 4-step RACH in the cell(s) and/or the beam(s).

Embodiment 29: The second network node of embodiment 28 wherein the second network node is further adapted to perform the method of any one of embodiments 26 to 27.

Embodiment 30: A second network node (e.g., a network node that implements a gNB-DU 502), the second network node comprising processing circuitry configured to cause the second network node to: obtain (700-702) information related to 2-step Random Access Channel, RACH, and/or 4-step RACH configurations for a cell(s) and/or a beam(s) controlled by a first network node (e.g., a gNB-CU 500); determine (704), based on the obtained information, an adjustment to RACH resources used for the 2-step RACH and/or 4-step RACH in the cell(s) and/or the beam(s); transmit (706), to the first network node, information that is indicative of the adjustment to the RACH resources used for the 2-step RACH and/or 4-step RACH in the cell(s) and/or the beam(s).

Those skilled in the art will recognize improvements and modifications to the embodiments of the present disclosure. All such improvements and modifications are considered within the scope of the concepts disclosed herein.

The invention claimed is:

1. A method performed by a first network node for Random Access Channel, RACH, configuration, the method comprising:
   obtaining information related to 2-step RACH, 4-step RACH, or both 2-step RACH and 4-step RACH, for one or more cells controlled by the first network node, one or more beams controlled by the first network node, or both one or more cells and one or more beams controlled by the first network node;
   determining, based on the obtained information, first assistance information for 2-step RACH configuration, 4-step RACH configuration, or both the 2-step RACH configuration and the 4-step RACH configuration, for the one or more cells controlled by the first network node, the one or more beams controlled by the first network node, or both the one or more cells and the one or more beams controlled by the first network node; and
   transmitting, to a second network node, second assistance information for the 2-step RACH configuration, the 4-step RACH configuration, or both the 2-step RACH configuration and the 4-step RACH configuration, for the one or more cells controlled by the first network node, the one or more beams controlled by the first network node, or both the one or more cells and the one or more beams controlled by the first network node;
   wherein the second assistance information comprises the first assistance information or information that indicates one or more parts of the first assistance information.

2. The method of claim 1, wherein the first network node is a Central Unit, CU, of a base station having a split CU/Distributed Unit, DU, architecture, and the second network node is a DU of the base station.

3. The method of claim 1, wherein the first assistance information comprises:
   a) information that indicates whether 2-step RACH may be configured for the one or more cells controlled by the first network node, the one or more beams controlled by the first network node, or both the one or more cells and the one or more beams controlled by the first network node;
   b) information that indicates whether 4-step RACH may be configured for the one or more cells controlled by the first network node, the one or more beams controlled by the first network node, or both the one or more cells and the one or more beams controlled by the first network node;
   c) information that indicates whether 2-step RACH may be configured for one or more downlink reference signal beams transmitted on the one or more cells controlled by the first network node, the one or more beams controlled by the first network node, or both the one or more cells and the one or more beams controlled by the first network node;
   d) information that indicates whether 4-step RACH may be configured for one or more downlink reference signal beams transmitted on the one or more cells controlled by the first network node, the one or more beams controlled by the first network node, or both the one or more cells and the one or more beams controlled by the first network node;
e) information that indicates one or more downlink reference signal beams that may benefit from 2-step RACH;
f) information that indicates one or more downlink reference signal beams that may benefit from 4-step RACH;
g) a measurement value threshold that may be adopted by a User Equipment, UE, to determine whether to select the 2-step RACH or the 4-step RACH; or
h) a combination of any two or more of (a)-(g).

4. The method of claim 1, wherein the second assistance information comprises:
i) an indication of a preference on whether to configure 2-step RACH resources for the one or more cells controlled by the first network node, the one or more beams controlled by the first network node, or both the one or more cells and the one or more beams controlled by the first network node;
ii) an indication of a preference on whether to configure 4-step RACH resources for the one or more cells controlled by the first network node, the one or more beams controlled by the first network node, or both the one or more cells and the one or more beams controlled by the first network node;
iii) an indication of a suggested ratio between 2-step RACH resources and 4-step RACH resources for the one or more cells controlled by the first network node, the one or more beams controlled by the first network node, or both the one or more cells and the one or more beams controlled by the first network node;
iv) an indication of whether shared or separate 2-step RACH and 4-step RACH occasions are recommended or required;
v) a measurement value threshold for the one or more cells controlled by the first network node, the one or more beams controlled by the first network node, or both the one or more cells and the one or more beams controlled by the first network node, to be adopted by a User Equipment, UE, to determine whether to select the 2-step RACH or the 4-step RACH;
vi) statistical information about measurements reported to the first network node;
vii) statistical information about 2-step RACH or 4-step RACH procedure performance at one or more neighboring cells and/or one or more neighboring beams;
viii) statistical information about measurements reported to the first network node associated to a coverage area of downlink reference signal beams for the one or more cells controlled by the first network node, the one or more beams controlled by the first network node, or both the one or more cells and the one or more beams controlled by the first network node;
ix) for some or all cells served by the second network node, information that indicates levels of interference experienced by neighboring cells for msg1 and/or msgA; or
x) a combination of any two or more of (i)-(ix).

5. The method of claim 1, wherein the first network node is a Central Unit, CU, of a base station, and obtaining the information comprises receiving one or more CU-to-CU messages from one or more other CUs of one or more other base stations that control one or more neighboring cells and/or one or more neighboring beams, the one or more CU-to-CU messages comprising at least some of the information.

6. The method of claim 5, wherein each CU-to-CU message comprises:
A) information that indicates a load or interference perceived on an uplink on RACH resources comprised in the 2-step RACH configuration for the one or more cells controlled by the first network node, the one or more beams controlled by the first network node, or both the one or more cells and the one or more beams controlled by the first network node;
B) information that indicates a load or interference perceived on an uplink on RACH resources comprised in the 4-step RACH configuration for the one or more cells controlled by the first network node, the one or more beams controlled by the first network node, or both the one or more cells and the one or more beams controlled by the first network node;
C) information that indicates interference as perceived on an uplink on an entire carrier frequency range;
D) information that indicates a RACH resource allocation associated to downlink reference signal beams in one or more respective neighboring cells;
E) information that indicates a RACH performance associated to the one or more respective neighboring cells or to a coverage area of downlink reference signal beams transmitted in the one or more respective neighboring cells;
F) one or more measurements reported by one or more UEs on one or more respective cells; or
G) a combination of any two or more of (A)-(F).

7. The method of claim 1, wherein the first network node is a Central Unit, CU, of a base station, and obtaining the information comprises receiving one or more UE-to-CU messages from one or more UEs, the one or more UE-to-CU messages comprising at least some of the information.

8. The method of claim 7, wherein the one or more UE-to-CU messages comprise one or more RACH reports, one or more cell-based measurement reports, one or more beam-based measurement reports, or a combination thereof.

9. The method of claim 1, wherein obtaining the information comprises collecting statistical information about measurements reported to the first network node.

10. The method of claim 1, further comprising transmitting a message to a User Equipment, UE, that reflects information associated to a RACH resource adjustment for 2-step RACH, a RACH resource adjustment for 4-step RACH, or a RACH resource adjust for both 2-step RACH and 4-step RACH, in the one or more cells controlled by the first network node, the one or more beams controlled by the first network node, or both the one or more cells and the one or more beams controlled by the first network node.

11. The method of claim 1, wherein the second assistance information comprises information that indicates a requirement or recommendation to only configure 2-step RACH or to only configure 4-step RACH.

12. The method of claim 1, wherein the second assistance information comprises information that indicates a required or recommended relation between an amount of resources allocated to 2-step RACH as compared to an amount of resources allocated to 4-step RACH.

13. A first network node for Random Access Channel, RACH, configuration, the first network node comprising processing circuitry configured to cause the first network node to:

obtain information related to 2-step RACH, 4-step RACH, or both 2-step RACH and 4-step RACH, for one or more cells controlled by the first network node, one or more beams controlled by the first network node, or both one or more cells and one or more beams controlled by the first network node;

determine, based on the obtained information, first assistance information for 2-step RACH configuration, 4-step RACH configuration, or both the 2-step RACH configuration and the 4-step RACH configuration, for the one or more cells controlled by the first network node, the one or more beams controlled by the first network node, or both the one or more cells and the one or more beams controlled by the first network node; and transmit, to a second network node, second assistance information for the 2-step RACH configuration, the 4-step RACH configuration, or both the 2-step RACH configuration and the 4-step RACH configuration, for the one or more cells controlled by the first network node, the one or more beams controlled by the first network node, or both the one or more cells and the one or more beams controlled by the first network node;

wherein the second assistance information comprises the first assistance information or information that indicates one or more parts of the first assistance information.

14. A method performed by a second network node for Random Access Channel, RACH, configuration, the method comprising:

obtaining information related to 2-step RACH, 4-step RACH, or both 2-step RACH and 4-step RACH, for one or more cells controlled by the first network node, one or more beams controlled by the first network node, or both one or more cells and one or more beams controlled by the first network node;

determining, based on the obtained information, an adjustment to RACH resources used for the 2-step RACH, RACH resource used for the 4-step RACH, or both resources used for the 2-step RACH and resources used for the 4-step RACH, in the one or more cells controlled by the first network node, the one or more beams controlled by the first network node, or both the one or more cells and the one or more beams controlled by the first network node; and transmitting, to the first network node, information that is indicative of the adjustment to the RACH resources used for the 2-step RACH, the RACH resources used for the 4-step RACH, or both the resources used for the 2-step RACH and the resources used for the 4-step RACH.

15. The method of claim 14, wherein the obtained information comprises statistical information about performed 2-step RACH and 4-step RACH in the one or more cells controlled by the first network node, the one or more beams controlled by the first network node, or both the one or more cells and the one or more beams controlled by the first network node.

16. The method of claim 14, wherein the adjustment to the RACH resources used for the 2-step RACH, the RACH resources used for the 4-step RACH, or both the resources used for the 2-step RACH and the resources used for the 4-step RACH comprises:

a) a configuration of a 2-step RACH or 4-step RACH resource;

b) a de-configuration of a 2-step RACH or 4-step RACH resource;

c) an adjustment of an amount of time/frequency resources that are configured for 2-step RACH;

d) an adjustment of an amount of time/frequency resources that are configured to 4-step RACH;

e) a reconfiguration of 2-step RACH resources providing a different time/frequency resource allocation;

f) a reconfiguration of 4-step RACH resources providing a different time/frequency resource allocation;

g) a change in a measurement value threshold to be adopted by a User Equipment, UE, to determine whether to select 2-step RACH or 4-step RACH; or h) a combination of any two or more of (a)-(g).

17. A second network node for Random Access Channel, RACH, configuration, the second network node comprising processing circuitry configured to cause the second network node to:

obtain information related to 2-step RACH, 4-step RACH, or both 2-step RACH and 4-step RACH, for one or more cells controlled by the first network node, one or more beams controlled by the first network node, or both one or more cells and one or more beams controlled by the first network node;

determine, based on the obtained information, an adjustment to RACH resources used for the 2-step RACH, RACH resource used for the 4-step RACH, or both resources used for the 2-step RACH and resources used for the 4-step RACH, in the one or more cells controlled by the first network node, the one or more beams controlled by the first network node, or both the one or more cells and the one or more beams controlled by the first network node;

transmit, to the first network node, information that is indicative of the adjustment to the RACH resources used for the 2-step RACH, the RACH resources used for the 4-step RACH, or both the resources used for the 2-step RACH and the resources used for the 4-step RACH.

* * * * *